(12) United States Patent
Kim et al.

(10) Patent No.: US 9,341,877 B2
(45) Date of Patent: May 17, 2016

(54) LIQUID CRYSTAL DISPLAY AND METHOD OF MANUFACTURING THE SAME

(71) Applicant: Samsung Display Co., Ltd., Yongin, Gyeonggi-Do (KR)

(72) Inventors: Si Kwang Kim, Daegu (KR); Tae Gyun Kim, Seoul (KR); Woo Yong Sung, Seoul (KR); Hyoung Sub Lee, Hwaseong-si (KR); Ha-Young Park, Uijeongbu-si (KR); Tae Woon Cha, Seoul (KR); Se Hee Han, Seoul (KR)

(73) Assignee: Samsung Display Co., Ltd. (KR)

( * ) Notice: Subject to any disclaimer, the term of this patent is extended or adjusted under 35 U.S.C. 154(b) by 114 days.

(21) Appl. No.: 14/169,974

(22) Filed: Jan. 31, 2014

(65) Prior Publication Data

US 2015/0049286 A1   Feb. 19, 2015

(30) Foreign Application Priority Data

Aug. 19, 2013   (KR) .................. 10-2013-0098015

(51) Int. Cl.
G02F 1/1339   (2006.01)
G02F 1/1333   (2006.01)
G02F 1/1341   (2006.01)

(52) U.S. Cl.
CPC ........ *G02F 1/133345* (2013.01); *G02F 1/1341* (2013.01); *G02F 1/133305* (2013.01); *G02F 1/133377* (2013.01); *G02F 2001/133368* (2013.01)

(58) Field of Classification Search
USPC .............................. 349/86, 138, 154, 189, 190
See application file for complete search history.

(56) References Cited

U.S. PATENT DOCUMENTS

| 5,986,729 | A | 11/1999 | Yamanaka et al. |
| 6,141,072 | A | 10/2000 | Drabik et al. |
| 2010/0328599 | A1* | 12/2010 | Kumashiro et al. ........... 349/156 |
| 2012/0062448 | A1* | 3/2012 | Kim et al. ...................... 345/55 |

FOREIGN PATENT DOCUMENTS

| JP | 07-248504 | 9/1995 |
| JP | 07-318955 | 12/1995 |
| JP | 2001-183682 | 7/2001 |
| JP | 3613896 | 11/2004 |
| JP | 2006-201547 | 8/2006 |
| JP | 2008-129331 | 6/2008 |
| KR | 10-0875714 | 12/2008 |

* cited by examiner

*Primary Examiner* — Lucy Chien
(74) *Attorney, Agent, or Firm* — Innovation Counsel LLP

(57) ABSTRACT

A liquid crystal display includes a thin film transistor disposed on a substrate, a pixel electrode connected to the thin film transistor, a lower insulating layer disposed facing the pixel electrode, a roof layer disposed on the lower insulating layer, and a microcavity formed between the pixel electrode and the lower insulating layer. The microcavity includes a liquid crystal layer including a liquid crystal material. The liquid crystal display further includes a first groove formed between a first pixel area and a second pixel area, a second groove formed between the first pixel area and a third pixel area, wherein the first groove is covered by the roof layer, the second groove is exposed at a portion where the roof layer is removed, the first pixel area corresponds to the pixel electrode, and the first pixel area is disposed between the second pixel area and the third pixel area.

20 Claims, 30 Drawing Sheets

LIQUID CRYSTAL DISPLAY AND METHOD OF MANUFACTURING THE SAME

CROSS-REFERENCE TO RELATED APPLICATION

This application claims priority to and the benefit of Korean Patent Application No. 10-2013-0098015 filed in the Korean Intellectual Property Office on Aug. 19, 2013, the entire contents of which are incorporated herein by reference.

BACKGROUND (a) Field

The present disclosure relates to a liquid crystal display and a method of manufacturing the liquid crystal display.

(b) Description of the Related Art

Liquid crystal displays are widely used in flat panel displays. A liquid crystal display typically includes two display panels on which electrodes (such as a pixel electrode and a common electrode) are formed, and a liquid crystal layer disposed between the electrodes.

When a voltage is applied to the electrodes, an electric field is generated between the electrodes. The electric field determines the alignment of liquid crystal molecules in the liquid crystal layer and controls polarization of incident light, thereby displaying an image on the liquid crystal display.

A method of manufacturing the liquid crystal display may include forming a cavity in a pixel unit and filling the cavity with a liquid crystal. For example, the method may include forming a sacrificial layer comprising an organic material, forming a supporting member on the sacrificial layer, removing the sacrificial layer to form an empty space beneath the supporting member, and filling the empty space with a liquid crystal through a liquid crystal injection hole.

After the liquid crystal is injected into the empty space, the liquid crystal injection hole may be capped with a coating material. However, the capping material may come into contact with the liquid crystal and contaminate the liquid crystal.

SUMMARY

The present disclosure is directed to address at least the above issues relating to the contamination of liquid crystal in a liquid crystal display.

According to some embodiments of the inventive concept, a liquid crystal display is provided. The liquid crystal display includes a thin film transistor disposed on a substrate; a pixel electrode connected to the thin film transistor; a lower insulating layer disposed facing the pixel electrode; and a roof layer disposed on the lower insulating layer, wherein a microcavity is formed between the pixel electrode and the lower insulating layer, the microcavity includes a liquid crystal layer including a liquid crystal material, and a first groove is formed between a first pixel area and a second pixel area, a second groove is formed between the first pixel area and a third pixel area, wherein the first groove is covered by the roof layer, the second groove is exposed at a portion where the roof layer is removed, the first pixel area corresponds to the pixel electrode, and the first pixel area is disposed between the second pixel area and the third pixel area.

In some embodiments, the liquid crystal display may further include an overcoat layer disposed on the roof layer, wherein the overcoat layer may be disposed in the second groove and the liquid crystal material may be disposed in the first groove.

In some embodiments, a liquid crystal injection hole may be formed at an end of the first groove, and the liquid crystal injection hole may be capped by a capping material.

In some embodiments, an alignment layer may be disposed in at least one of a space between the microcavity and the pixel electrode, and a space between the microcavity and the lower insulating layer.

In some embodiments, a partition wall formed of an alignment material may be disposed at an edge portion of the microcavity adjacent to the second groove.

In some embodiments, the partition wall may separate the second groove and the microcavity.

In some embodiments, a thickness of the roof layer at a first region corresponding to the partition wall may be greater than a thickness of the roof layer at a second region corresponding to the microcavity.

In some embodiments, the liquid crystal display may further include a common electrode disposed between the microcavity and the lower insulating layer.

In some embodiments, the liquid crystal display may further include a light blocking member disposed on the substrate, wherein the first groove and the second groove may be formed in a direction in which the light blocking member extends.

In some embodiments, the liquid crystal display may further include a plurality of microcavities, and a partition wall forming portion disposed between adjacent microcavities parallel to a direction in which the first groove or the second groove extends, wherein the partition wall forming portion comprises the roof layer.

According to some other embodiment of the inventive concept, a method of manufacturing a liquid crystal display is provided. The method includes forming a thin film transistor on a substrate; forming a pixel electrode connected to the thin film transistor; forming a sacrificial layer on the pixel electrode; forming a lower insulating layer on the sacrificial layer; forming a roof layer on the lower insulating layer; forming a microcavity between a first groove and a second groove by removing the sacrificial layer; injecting a liquid crystal material through a liquid crystal injection hole formed at an end portion of the first groove; and capping the liquid crystal injection hole, wherein the first groove is covered by the roof layer, and the second groove is exposed at a portion where the roof layer is removed.

In some embodiments, forming the sacrificial layer may include forming a first sacrificial layer and a second sacrificial layer, wherein the first sacrificial layer is formed in a region where the first groove is formed, and a trench is formed between the second sacrificial layer and another adjacent second sacrificial layer.

In some embodiments, forming the sacrificial layer may further include forming a recessed portion in the second sacrificial layer.

In some embodiments, forming the roof layer may include forming the first sacrificial layer so as to cover the pixel electrode, and removing the portion of the roof layer so as to expose the second groove.

In some embodiments, a width of the removed portion of the roof layer may be less than a width of the recessed portion.

In some embodiments, removing the sacrificial layer may include injecting a chemical for removing the sacrificial layer through the second groove.

In some embodiments, the method may further include injecting an alignment material into the microcavity and drying the alignment material, wherein solids remaining after the drying of the alignment material may form a partition wall at an edge portion of the microcavity adjacent to the second groove.

In some embodiments, the liquid crystal material injected through the liquid crystal injection hole may flow along the first groove into the microcavity.

In some embodiments, the injecting of the liquid crystal material may be performed in a vacuum environment.

In some embodiments, the method may further include forming an overcoat layer on the roof layer, wherein the overcoat layer may be disposed in the second groove.

DETAILED DESCRIPTION

Figure 1:
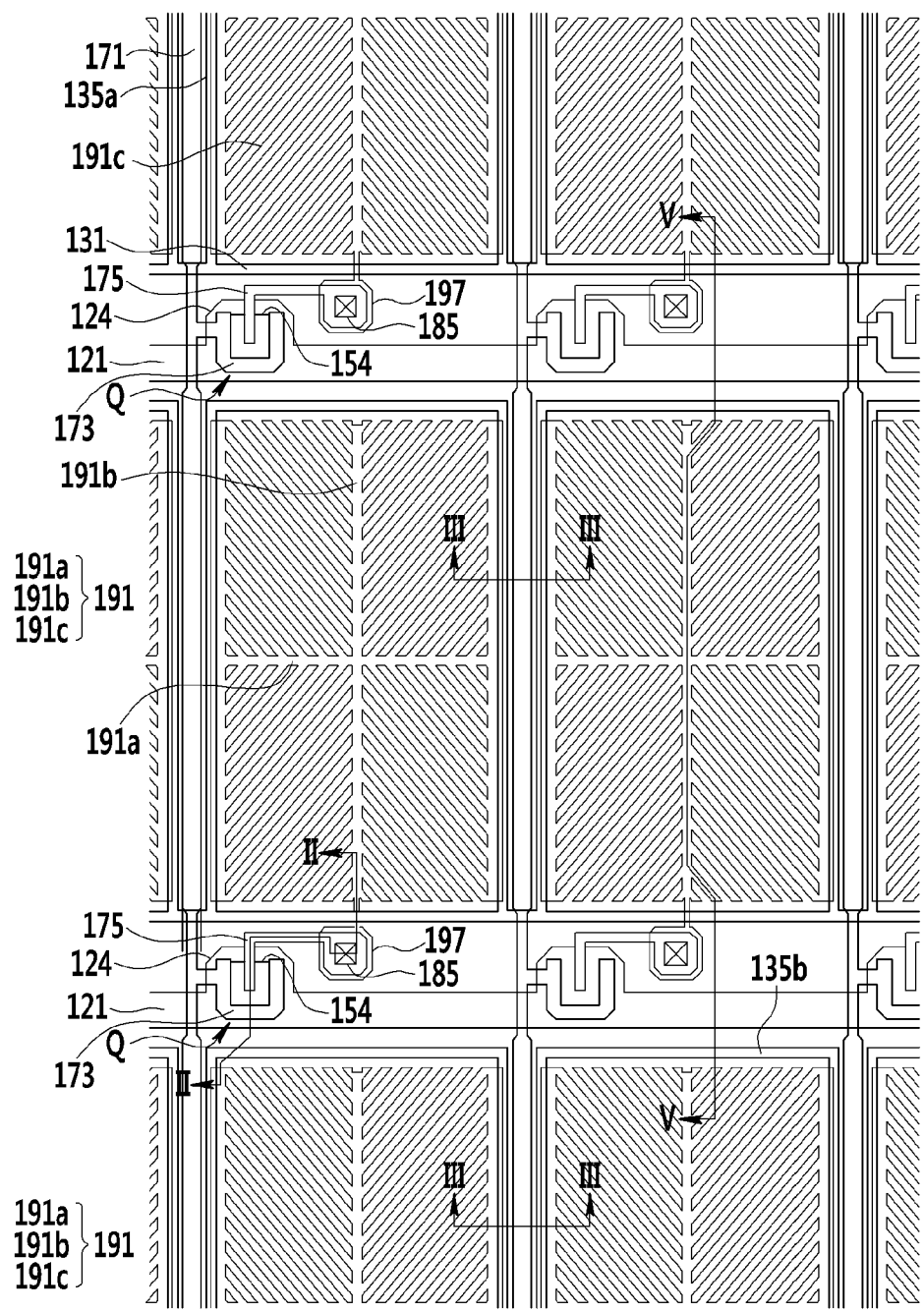
FIG. 1 is a top plan view illustrating a liquid crystal display according to an exemplary embodiment of the inventive concept.

Exemplary embodiments of the inventive concept will be described with reference to the accompanying drawings. However, the inventive concept is not limited to the described embodiments, and may be implemented in other forms.

In the drawings, the thickness of layers, films, panels, regions, etc., may be exaggerated for clarity. It will be understood that when a layer is referred to as being disposed or formed "on" another layer or substrate, it can be disposed or formed directly on the other layer or substrate, or with one or more intervening layers or elements being present. Like reference numerals designate like elements throughout the specification.

Figure 2:
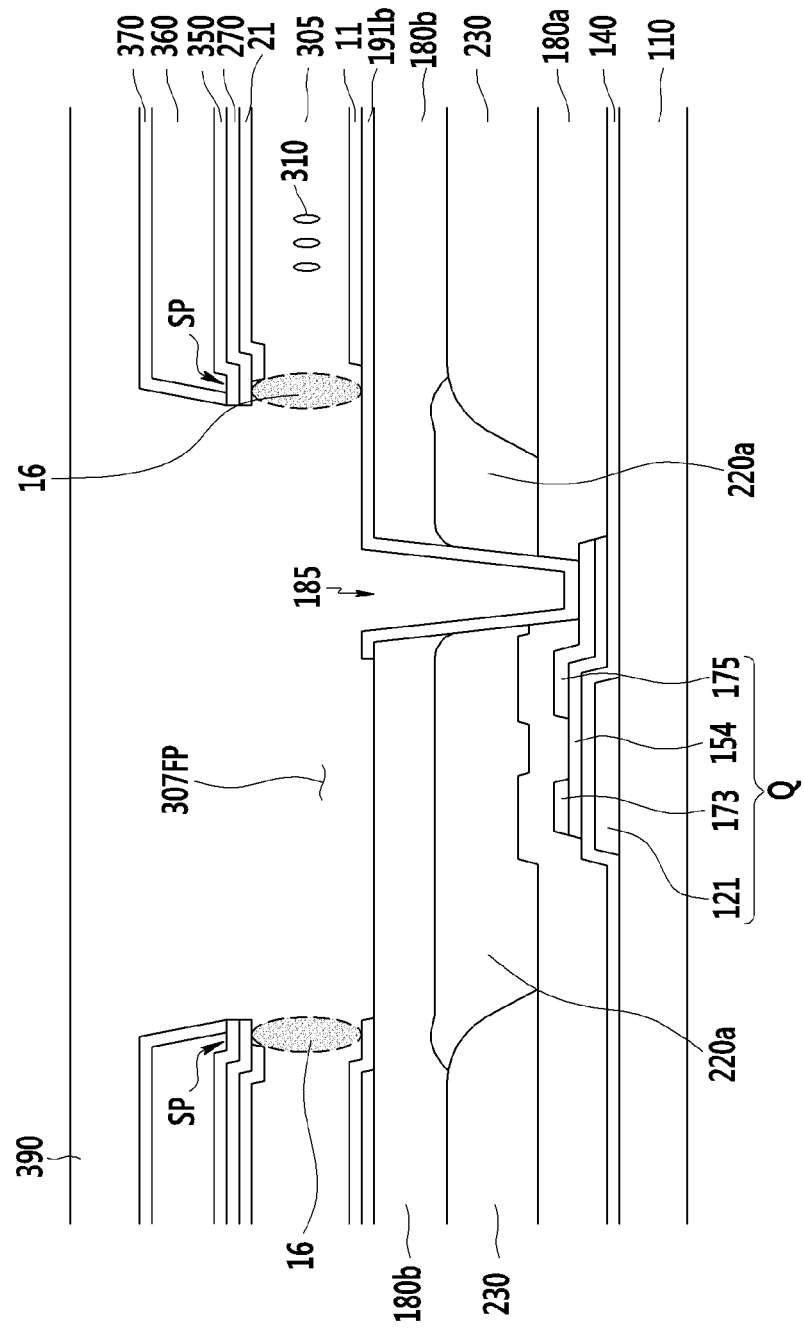
FIG. 2 is a cross-sectional view taken along line II-II of FIG. 1.
Figure 3:
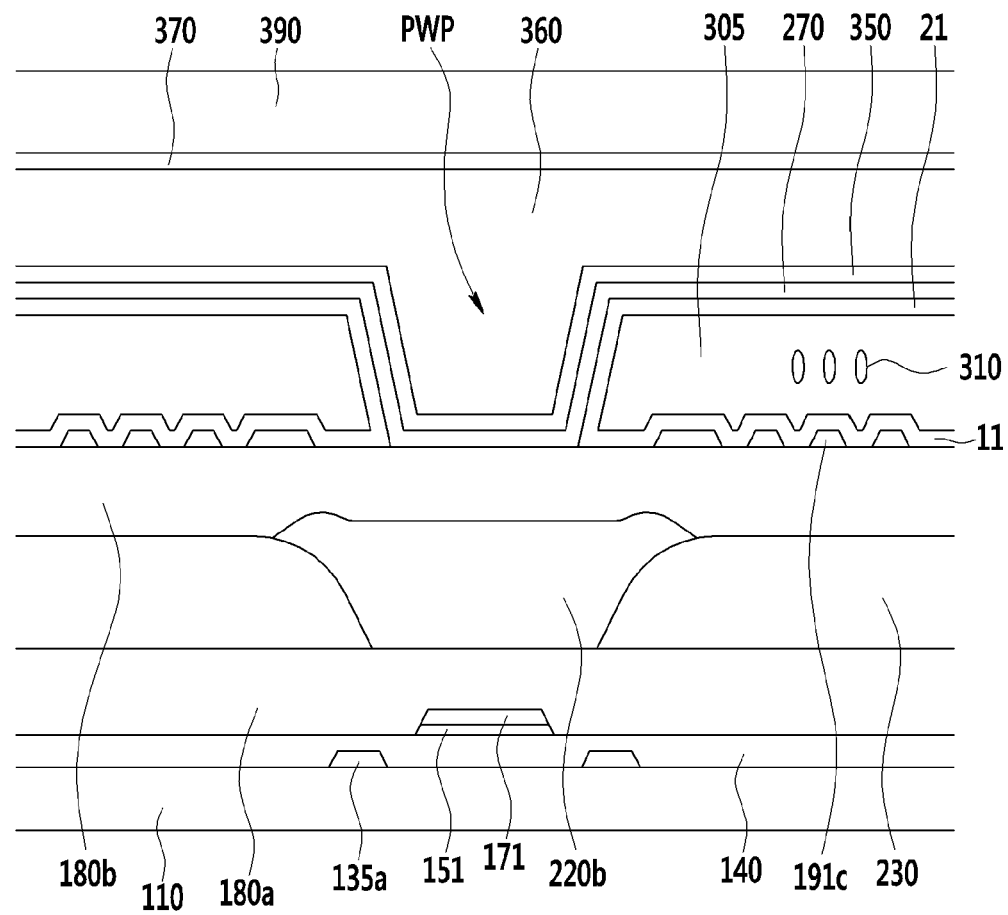
FIG. 3 is a cross-sectional view taken along line III-III of FIG. 1.

FIG. 1 is a top plan view illustrating a liquid crystal display according to an exemplary embodiment of the inventive concept. FIG. 2 is a cross-sectional view taken along line II-II of FIG. 1. FIG. 3 is a cross-sectional view taken along line III-III of FIG. 1.

Referring to FIGS. 1 to 3, a gate line 121 and a storage electrode line 131 are formed on an insulating substrate 110. The insulating substrate 110 may be formed of transparent glass or plastic. The gate line 121 includes a gate electrode 124. The storage electrode line 131 extends in a substantially horizontal direction, and transfers a predetermined voltage (such as a common voltage Vcom). The storage electrode line 131 includes a pair of vertical portions 135a extending substantially perpendicular to the gate line 121, and a horizontal portion 135b connecting the ends of the pair of vertical portions 135a to each other. The storage electrode line 131 forms a structure surrounding a pixel electrode 191.

A gate insulating layer 140 is formed on the gate line 121 and the storage electrode line 131. A semiconductor layer 151 and a semiconductor layer 154 are formed on the gate insulating layer 140. The semiconductor layer 151 is disposed beneath a lower portion of a data line 171, and the semiconductor layer 154 is disposed beneath a lower portion of a source electrode 173 and a drain electrode 175 and at a channel portion of a thin film transistor Q.

A plurality of ohmic contacts (not illustrated) may be formed on each of the semiconductor layers 151 and 154, and between the data line 171 and the source/drain electrodes 173/175 of the thin film transistor Q.

Data conductors are formed on each of the semiconductor layers 151 and 154 and the gate insulating layer 140. The data conductors include the data line 171, the source electrode 173, and the drain electrode 175. The data line 171 is connected to the source electrode 173.

The gate electrode 124, source electrode 173, and drain electrode 175, together with the semiconductor layer 154, collectively constitute the thin film transistor Q. A channel of the thin film transistor Q is formed on a portion of the semiconductor layer 154 between the source electrode 173 and the drain electrode 175.

A first interlayer insulating layer 180a is formed on the data conductors 171, 173, and 175, and on an exposed portion of the semiconductor layer 154. The first interlayer insulating layer 180a may include an inorganic insulating material (such as silicon nitride SiNx or silicon oxide SiOx) or an organic insulating material.

A color filter 230 and a light blocking member 220 are formed on the first interlayer insulating layer 180a.

The light blocking member 220 has a lattice structure having an opening corresponding to a region for displaying an image. The light blocking member 220 is formed of a material that prevents light from being transmitted through the light blocking member 220. The light blocking member 220 is formed at the opening of the color filter 230. The light blocking member 220 includes a horizontal light blocking member 220a formed in a direction parallel to the gate line 121 and a vertical light blocking member 220b formed in a direction parallel to the data line 171.

The color filter 230 may display one of three primary colors (e.g. red, green, or blue). However, the color filter 230 is not limited to displaying the three primary colors listed above. In some embodiments, the color filter 230 may also display one of a cyan-based color, a magenta-based color, a yellow-based color, and a white-based color. The color filter 230 may be formed of a material capable of displaying a different color for each adjacent pixel.

A second interlayer insulating layer 180b is formed on the color filter 230 and the light blocking member 220 covering the color filter 230 and the light blocking member 220. The second interlayer insulating layer 180b may include an inorganic insulating material (such as silicon nitride (SiNx) or silicon oxide (SiOx)) or an organic insulating material. In some embodiments, a step is generated due to a difference in a thickness between the color filter 230 and the light blocking member 220. Accordingly, in those embodiments, a thickness of the second interlayer insulating layer 180b may be adjusted so as to reduce or remove the step.

A contact hole 185 is formed in the color filter 230, light blocking member 220, and interlayer insulating layers 180a and 180b. The contact hole 185 is formed exposing a portion of the drain electrode 175.

A pixel electrode 191 is disposed on the second interlayer insulating layer 180b. The pixel electrode 191 may be formed of a transparent conductive material (such as ITO or IZO).

Referring to FIG. 1, the pixel electrode 191 is shaped as a quadrangle including a cross-shaped stem portion. Specifically, the pixel electrode 191 includes a horizontal stem portion 191a and a vertical stem portion 191b crossing the horizontal stem portion 191a. In addition, the pixel electrode 191 is divided into four subregions by the horizontal stem portion 191a and the vertical stem portion 191b, and each subregion includes a plurality of micro-branch portions 191c. The pixel electrode 191 may further include an outer stem portion surrounding an outer side of the pixel electrode 191.

The micro-branch portion 191c of the pixel electrode 191 is formed at an angle of approximately 40 degrees to 45 degrees with respect to the gate line 121 or the horizontal stem portion 191a. The micro-branch portions 191c of adjacent subregions may be orthogonal to each other. Also, a width of the micro-branch portion 191c may be gradually increased, such that intervals between the micro-branch portions 191c may be different at different locations.

The pixel electrode 191 also includes an extended portion 197 connected at a lower end of the vertical stem portion 191b. The extended portion 197 has a wider area than the vertical stem portion 191b. The pixel electrode 191 is physically and electrically connected to the drain electrode 175 through the contact hole 185 at the extended portion 197, and receives a data voltage from the drain electrode 175.

It should be noted that the aforementioned thin film transistor Q and pixel electrode 191 are merely exemplary and may be modified by one of ordinary skill in the art. For example, the structure of the thin film transistor Q and the design of the pixel electrode 191 may be modified in various ways to improve side visibility of an image on the liquid crystal display.

A lower alignment layer 11 is formed on the pixel electrode 191. The lower alignment layer 11 is a liquid crystal alignment layer and may include a vertical alignment layer. The lower alignment layer 11 may include materials such as polyamic acid, polysiloxane, or polyimide.

An upper alignment layer 21 is disposed facing the lower alignment layer 11, and a microcavity 305 is formed between the lower alignment layer 11 and the upper alignment layer 21. A liquid crystal material including liquid crystal molecules 310 is injected into the microcavity 305 through a liquid crystal injection hole 307. The microcavity 305 may be formed along a column direction (i.e. a vertical direction) of the pixel electrode 191. In the present exemplary embodiment, an alignment material (for forming the alignment layers 11 and 21) and the liquid crystal material (including the liquid crystal molecules 310) may be injected into the microcavity 305 using capillary force.

The microcavity 305 is divided in a vertical direction by a plurality of liquid crystal injection hole forming regions 307FP. The regions 307FP are disposed at a portion overlapping the gate line 121, and along the direction in which the gate line 121 extends. Each microcavity 305 may correspond to a pixel area, and the pixel area may correspond to a region for displaying an image.

A common electrode 270 and a lower insulating layer 350 are disposed on the upper alignment layer 21. When a common voltage is applied to the common electrode 270 and a data voltage is applied to the pixel electrode 191, an electric field is generated between the common electrode 270 and the pixel electrode 191. The electric field determines an alignment direction of the liquid crystal molecules 310 disposed in the microcavity 305 between the electrodes 270 and 191. The common electrode 270 forms a capacitor with the pixel electrode 191, and the capacitor maintains the received voltages even after the thin film transistor Q is turned off. The lower insulating layer 350 may be formed of silicon nitride (SiNx) or silicon oxide (SiO$_2$).

In the embodiment of FIGS. 1 to 3, the common electrode 270 is formed on the microcavity 305. In some embodiments, the common electrode 270 may be formed at a lower portion of the microcavity 305, so that the liquid crystal can be driven according to a horizontal electric field mode.

A roof layer 360 is disposed on the lower insulating layer 350. The roof layer 360 serves as a support so that the microcavity 305 (which is a space between the pixel electrode 191 and the common electrode 270) can be formed. The roof layer 360 may include photoresist or other organic materials.

An upper insulating layer 370 is disposed on the roof layer 360. The upper insulating layer 370 may be formed in contact with an upper surface of the roof layer 360. The upper insulating layer 370 may be formed of silicon nitride (SiNx) or silicon oxide (SiO$_2$).

In the present exemplary embodiment of FIG. 3, a partition wall forming portion PWP is formed between adjacent microcavities 305 in a horizontal direction. The partition wall forming portion PWP may be formed in a direction in which the data line 171 extends, and may be covered by the roof layer 360. The partition wall forming portion PWP may include the lower insulating layer 350, the common electrode 270, the upper insulating layer 370, and the roof layer 360. The partition wall forming portion PWP forms a partition wall, so as to divide or define the microcavity 305.

An overcoat layer 390 is disposed on the upper insulating layer 370. The overcoat layer 390 may be formed of an inorganic layer or an organic layer. In the present exemplary embodiment, the overcoat layer 390 is formed in contact with an upper surface and a side surface of the upper insulating layer 370. The overcoat layer 390 serves to protect the liquid crystal material injected into the microcavity 305 from external impact. The overcoat layer 390 may also serve as a planarization layer.

Next, a structure of the roof layer in the present exemplary embodiment will be described with reference to FIGS. 4 and 5.

Figure 4:
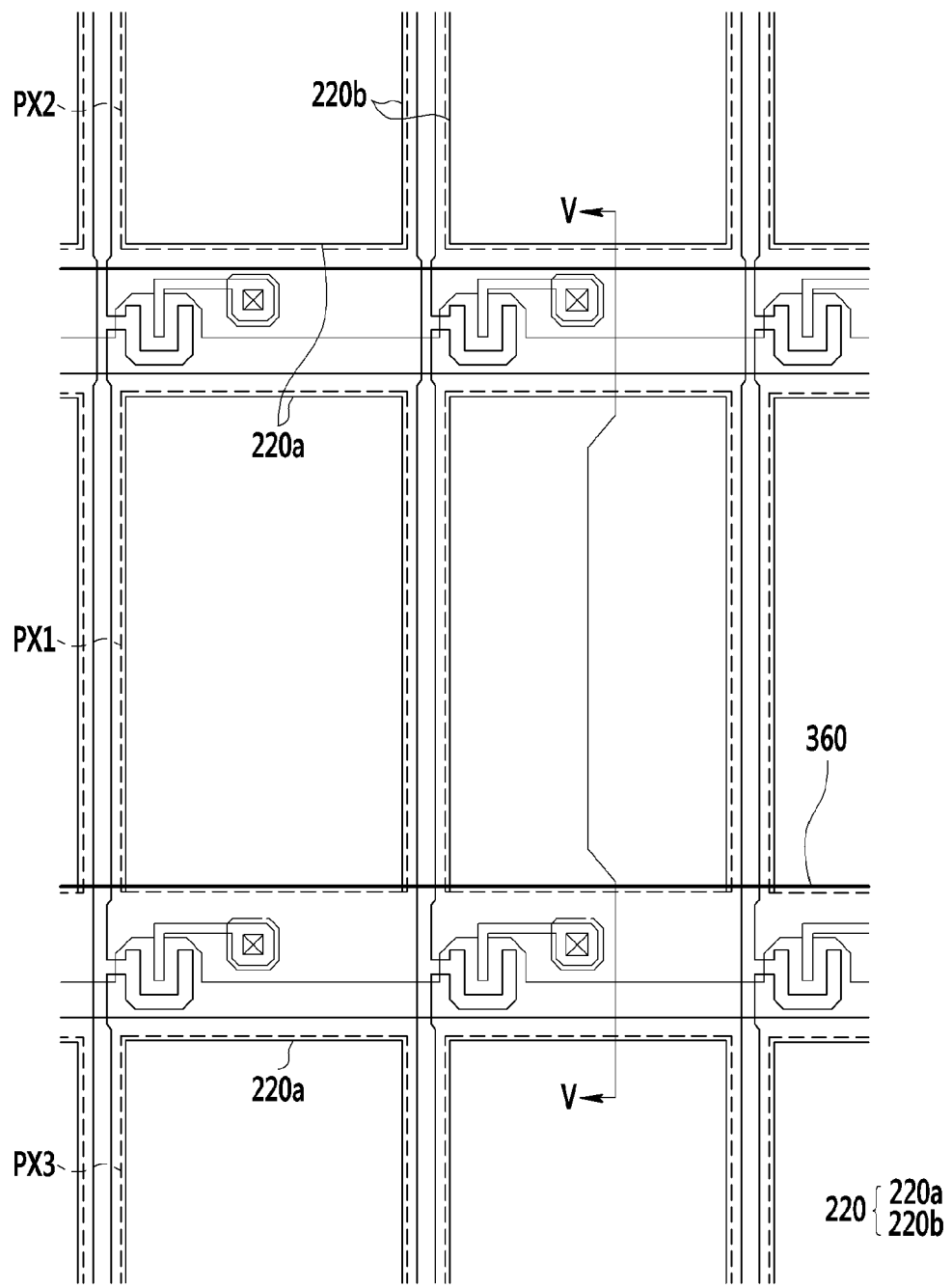
FIG. 4 is a top plan view illustrating an arrangement of a roof layer in the exemplary embodiment of FIGS. 1 to 3.

FIG. 4 is a top plan view schematically illustrating an arrangement of the roof layer in the exemplary embodiment of FIGS. 1 to 3. FIG. 5 is a cross-sectional view taken along line V-V of FIGS. 1 and 4.

Figure 5:
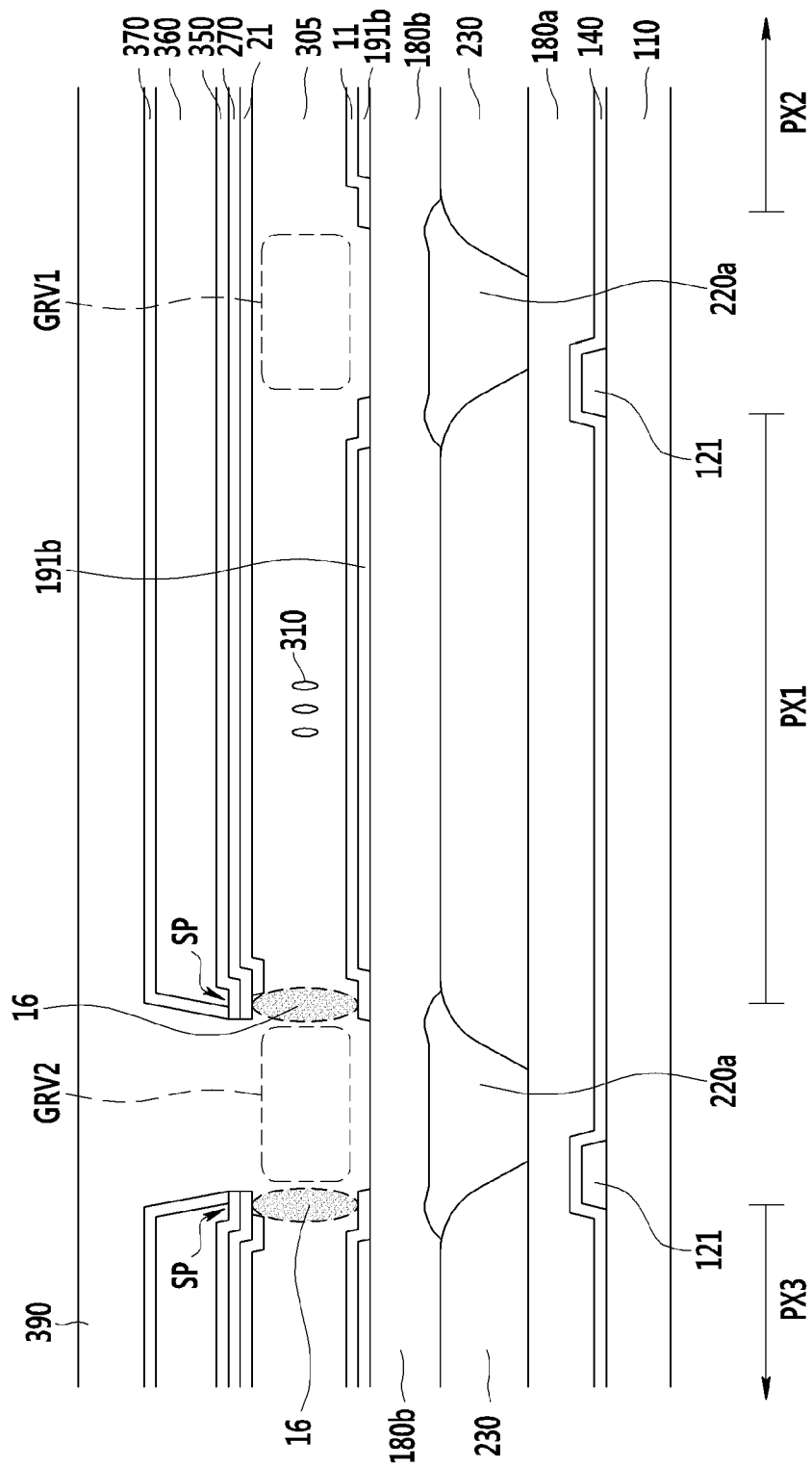
FIG. 5 is a cross-sectional view taken along line V-V of FIGS. 1 and 4.

Referring to FIGS. 4 and 5, a first pixel area PX1 is adjacent to a second pixel area PX2 and a third pixel area PX3, a first groove GRV1 is formed between the first pixel area PX1 and the second pixel area PX2, and a second groove GRV2 is formed between the first pixel area PX1 and the third pixel area PX3.

The roof layer 360 is formed over the first pixel area PX1 and the second pixel area PX2 while covering the first groove GRV1. The roof layer 360 is also formed over the first pixel area PX1 and the third pixel area PX3 while exposing the second groove GRV2.

As shown in FIG. 4, the pixel areas may have patterns repeated in different directions (up, down, left, and right), and every two grooves disposed between the pixel areas may be covered by the roof layer 360.

The first groove GRV1 and the second groove GRV2 may be formed in a direction parallel to the horizontal light blocking member 220a. The first groove GRV1 may be filled with the liquid crystal material, and the second groove GRV2 may be covered by the overcoat layer 390. In the present exemplary embodiment, a partition wall 16 is disposed at an edge portion of the microcavity 305 adjacent to the second groove GRV2. The partition wall 16 is formed by agglomerating solids that dry and remain after the alignment layers 11 and 21 are formed. The partition wall 16 prevents the liquid crystal material in the liquid crystal layer from coming into contact with the overcoat layer 390, and thus prevents the liquid crystal material from being contaminated by the overcoat layer 390.

In the present exemplary embodiment, the liquid crystal injection hole 307 (illustrated in FIGS. 24 and 27) is formed at an end portion of the first groove GRV1. The liquid crystal material is injected through the liquid crystal injection hole 307 into the first groove GRV1 and fills the microcavity 305 via capillary force, thereby forming the liquid crystal layer in the pixel area.

A thickness of the roof layer 360 disposed at a portion corresponding to the partition wall 16 may be greater than a thickness of the roof layer 360 disposed at another portion corresponding to the microcavity 305. As illustrated in FIGS. 2 and 5, the roof layer 360 includes a protrusion portion SP protruding downward at the edge portion of the microcavity 305. As a result of the protrusion portion SP, the solids (which remain after the alignment material injected into the microcavity 305 to form the alignment layers 11 and 21 has dried) agglomerate at the relatively narrower edge of the microcavity 305. The partition wall 16 is formed due to the agglomeration of the solids, and separates the second groove GRV2 and the microcavity 305. In the present exemplary embodiment, a protruding structure of the roof layer 360 is used to form the partition wall 16. Nevertheless, it should be noted that the method for forming a partition wall is not limited to the above-described configuration. For example, other methods can be used to form a partition wall having a relatively smaller cross-section at the edge portion of the microcavity 305, such that capillary force can be applied toward the edge of the microcavity 305 and where solids from the alignment material can agglomerate after the alignment layers 11 and 21 have been formed.

Figure 30:
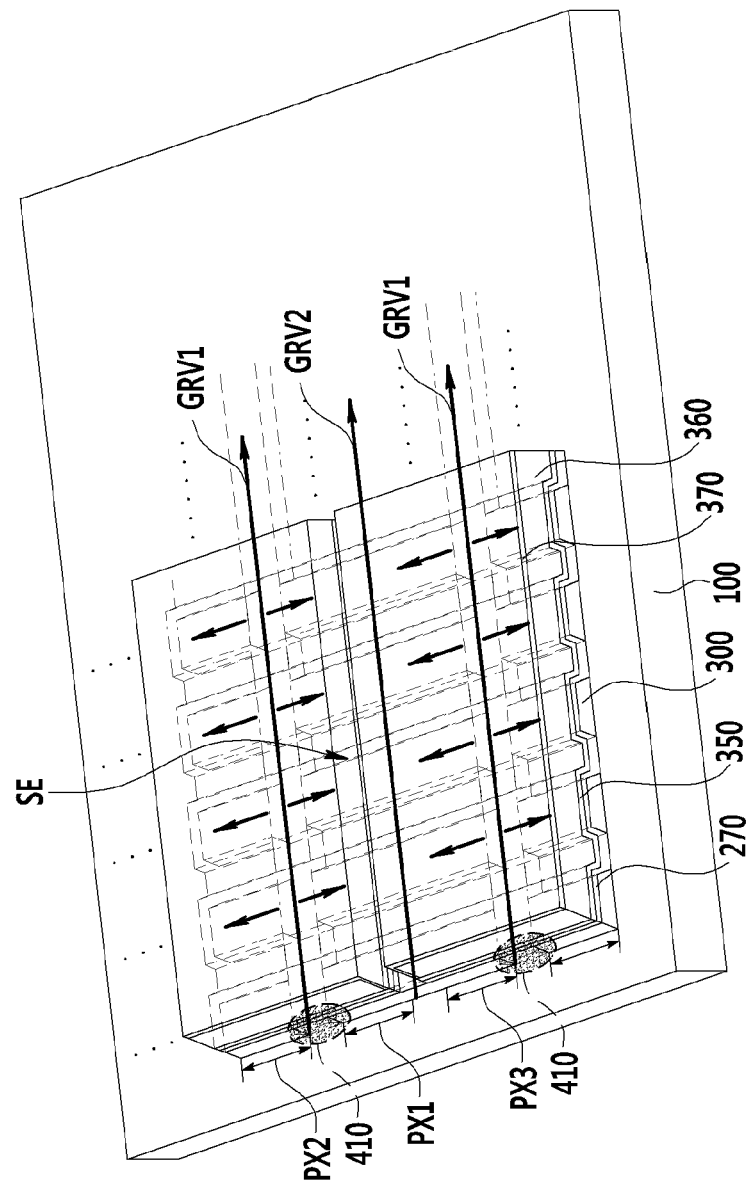

In the present exemplary embodiment, the liquid crystal injection hole 307 (illustrated in FIGS. 24 and 27) is covered by the capping material 410 (illustrated in FIG. 30).

A polarizer (not illustrated) is disposed under the insulating substrate 110 and on the upper insulating layer 370. The polarizer may include a polarizing element for generating polarized light and a tri-acetyl-cellulose (TAC) layer for increased durability. In some embodiments, the directions of the transmission axes of an upper polarizer and a lower polarizer may be vertical or parallel to each other.

FIGS. 6 to 30 include perspective views and cross-sectional views illustrating a method of manufacturing a liquid crystal display according to an exemplary embodiment of the inventive concept. FIGS. 6, 10, 13, 16, 19, 21, 24, 27, and 30 are perspective views illustrating a method of manufacturing the liquid crystal display including the pixel area pattern illustrated in FIG. 4.

FIGS. 7, 9, 11, 14, 17, 20, 22, 25, and 28 are cross-sectional views taken along line V-V of FIG. 1 at various stages of manufacturing. FIGS. 8, 12, 15, 18, 23, 26, and 29 are cross-sectional views taken along line III-III of FIG. 1 at various stages of manufacturing.

Figure 6:
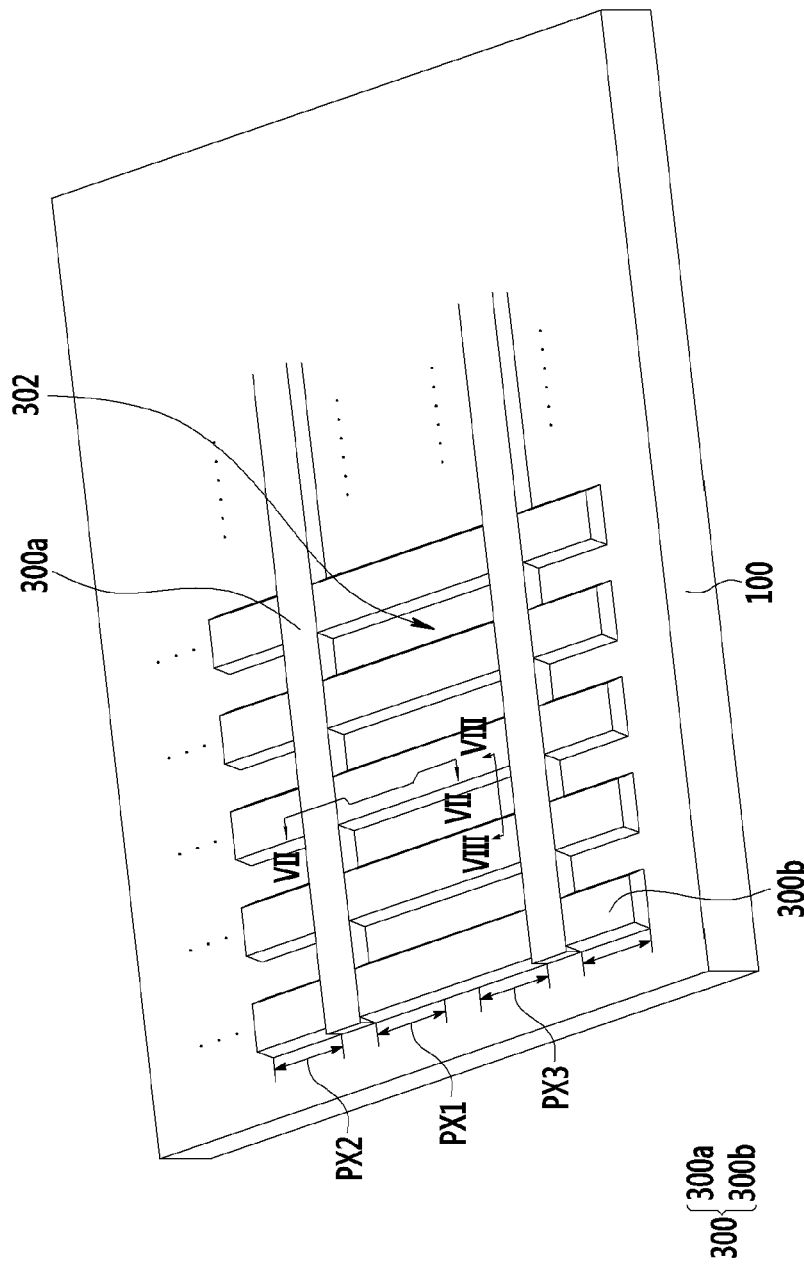
FIGS. 6 to 30 are perspective views and cross-sectional views illustrating a method of manufacturing a liquid crystal display according to an exemplary embodiment of the inventive concept.
Figure 7:
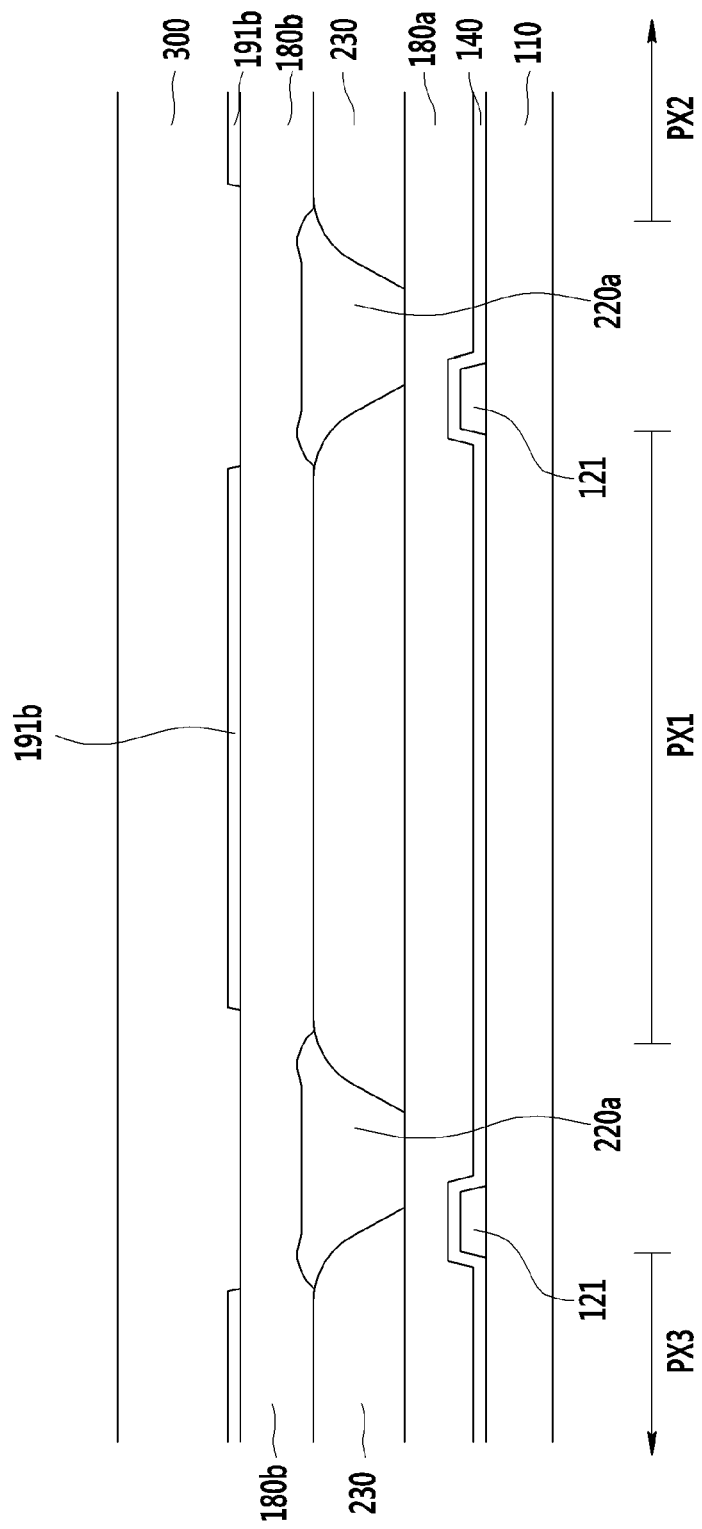
Figure 8:
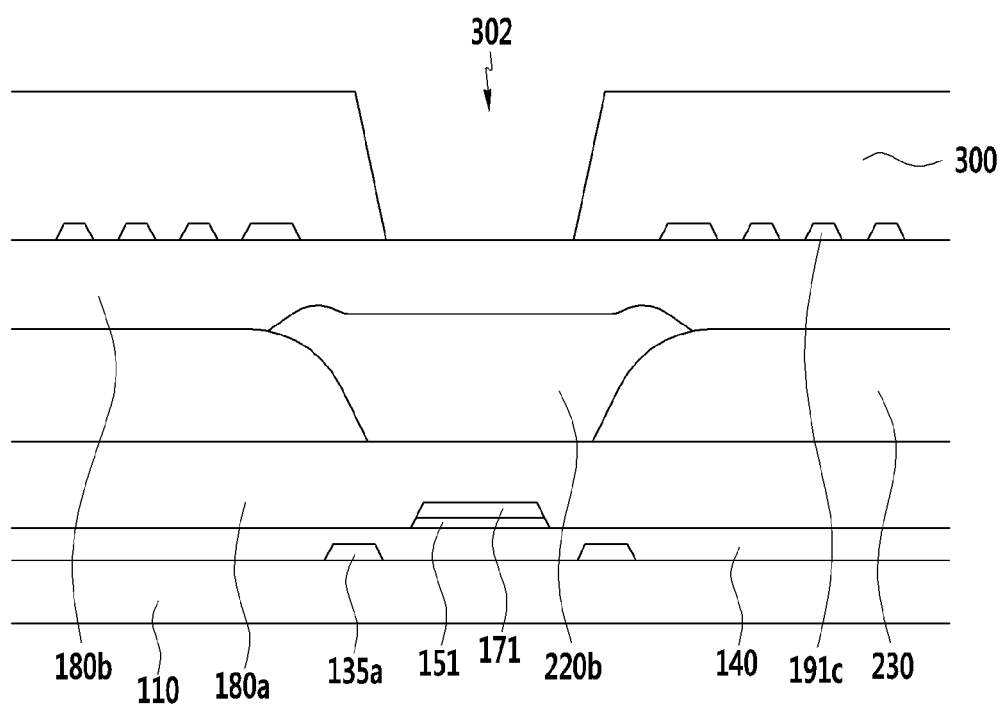

FIG. 6 is a perspective view illustrating the sacrificial layer 300 formed on a thin film transistor display panel 100 on which the thin film transistor and the pixel electrode are formed on a substrate. FIG. 7 is a cross-sectional view taken along line VII-VII of FIG. 6, and FIG. 8 is a cross-sectional view taken along line VIII-VIII of FIG. 6.

Referring to FIGS. 1, 2, and 6 to 8, a switching element (e.g. thin film transistor Q) is formed on a substrate 110. Specifically, the gate line 121 is formed extending in a horizontal direction, the gate insulating layer 140 is formed on the gate line 121, the semiconductor layers 151 and 154 are formed on the gate insulating layer 140, and the source electrode 173 and the drain electrode 175 are formed on the semiconductor layer 154. The data line 171 is connected to the source electrode 173, and may be formed extending in the vertical direction while crossing the gate line 121.

The first interlayer insulating layer 180a is formed on the data conductors. The data conductors include the source electrode 173, drain electrode 175, and data line 171. The first interlayer insulating layer 180a is also formed on the exposed portion of the semiconductor layer 154.

The color filter 230 is formed at a position corresponding to the pixel area on the first interlayer insulating layer 180a, and the light blocking member 220 is formed between adjacent color filters 230.

The second interlayer insulating layer 180b is formed on the color filter 230 and the light blocking member 220 covering the color filter 230 and the light blocking member 220. The pixel electrode 191 is electrically and physically connected to the drain electrode 175 through the contact hole 185 formed in the second interlayer insulating layer 180b.

The thin film transistor display panel 100 (including the thin film transistor Q and the pixel electrode 191) is formed by forming the pixel electrode 191 on the second interlayer insulating layer 180b. As illustrated in FIG. 6, the sacrificial layer 300 is formed on the thin film transistor display panel 100. The sacrificial layer 300 includes a first sacrificial layer 300a disposed in the pixel area in a direction parallel to the gate line 121, and a second sacrificial layer 300b disposed in the pixel area in a direction parallel to the data line 171. A trench 302 is formed between the second sacrificial layers 300b. The trench 302 is formed in a direction in which the data line 171 extends.

Figure 9:
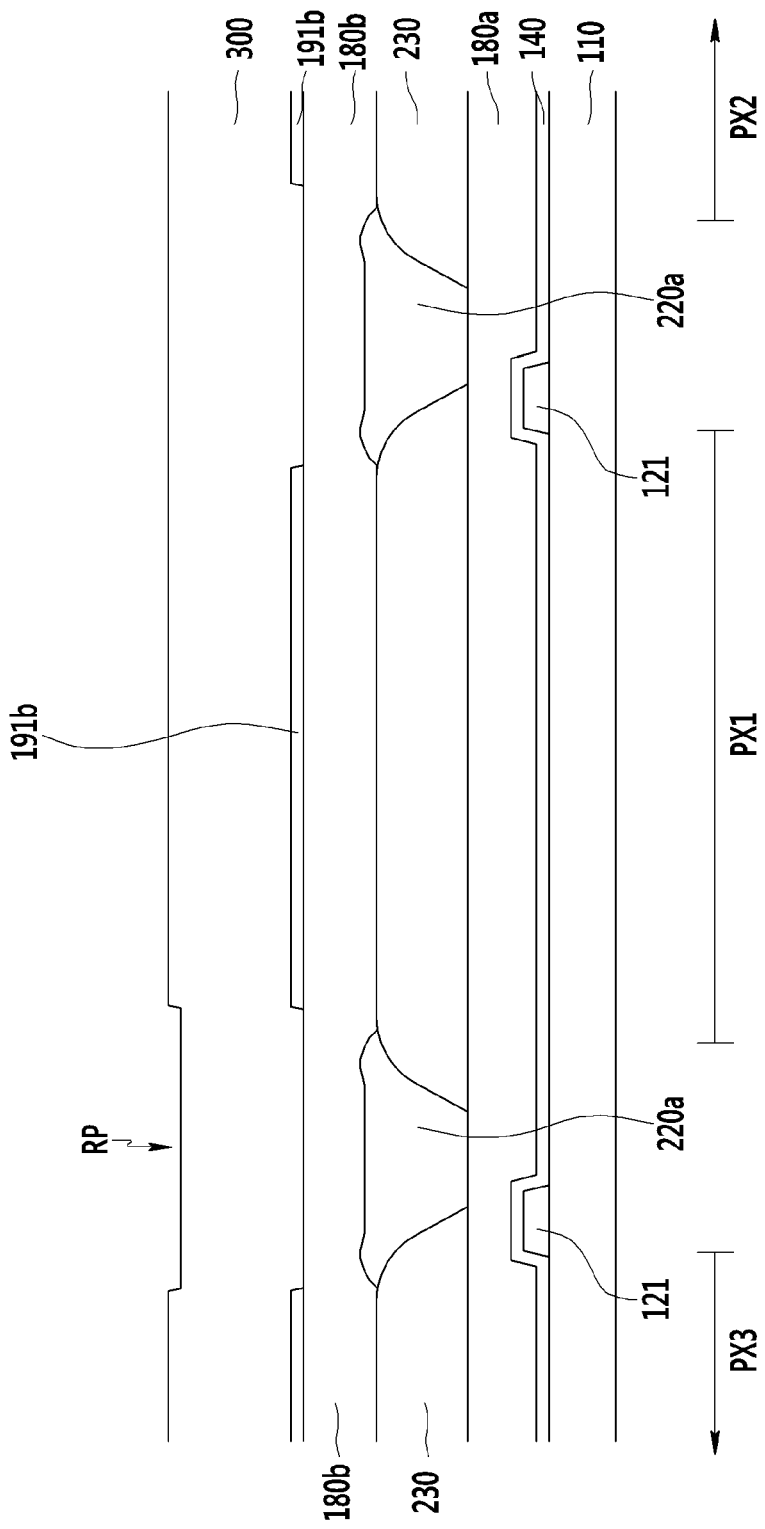

Referring to FIG. 9, a recessed portion RP is formed on an upper surface of the sacrificial layer 300. The recessed portion RP is formed on an upper surface of the second sacrificial layer 300b between the first pixel area PX1 and the third pixel area PX3.

Figure 10:
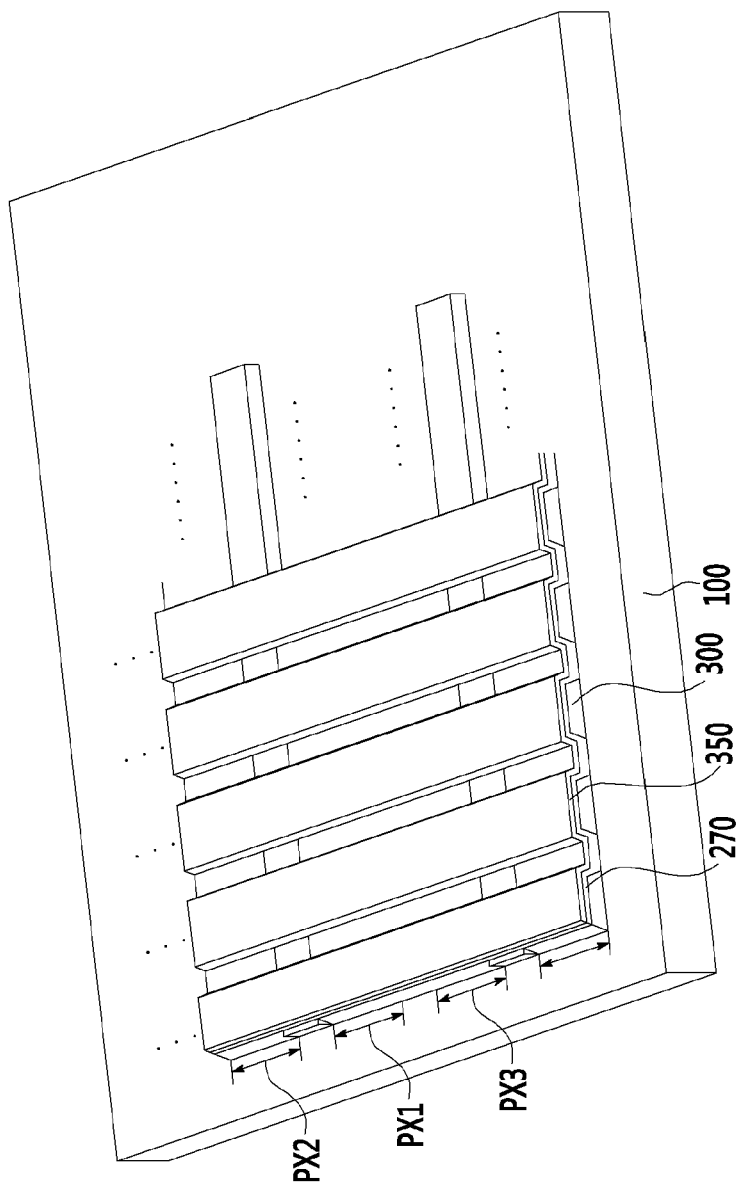
Figure 11:
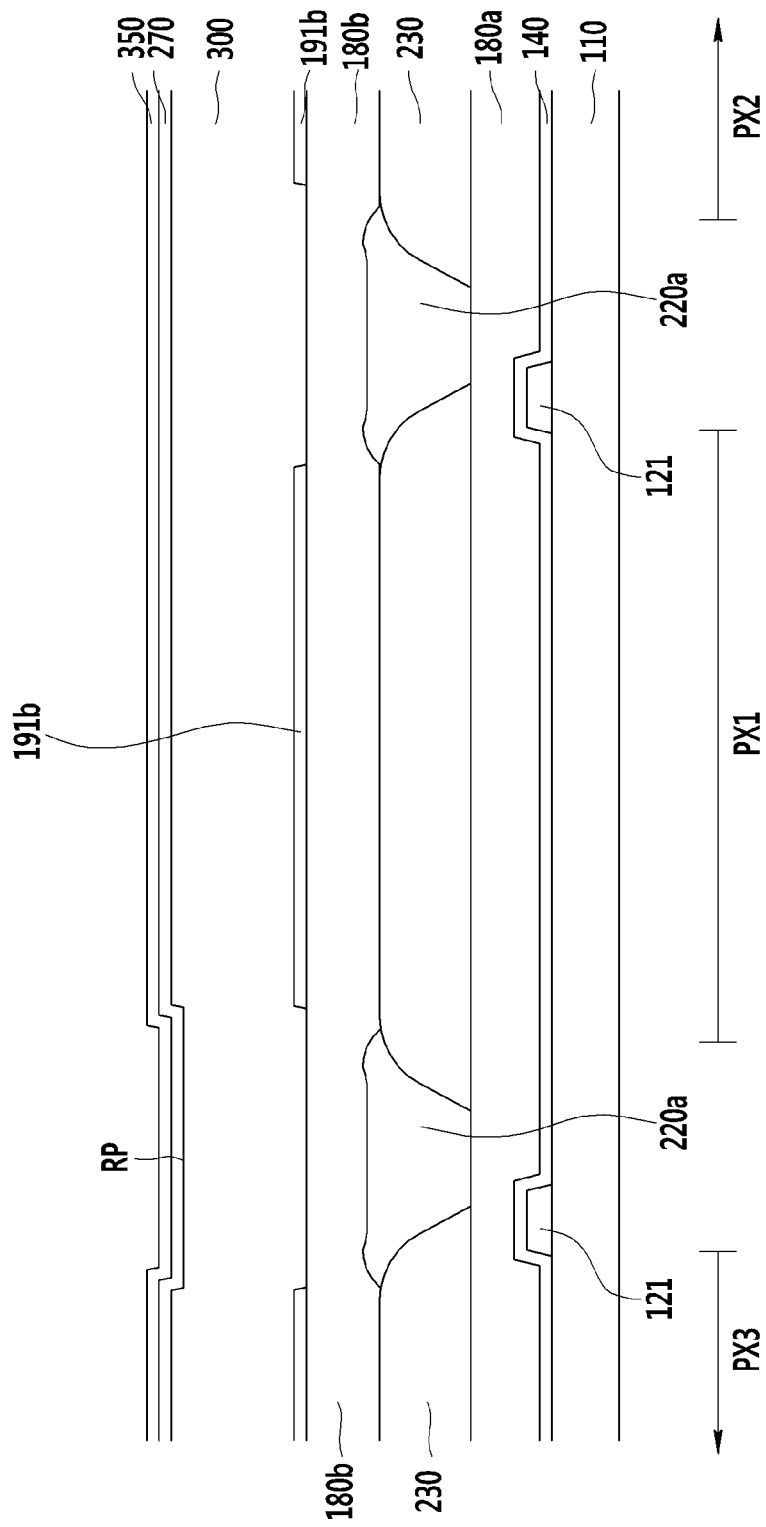
Figure 12:
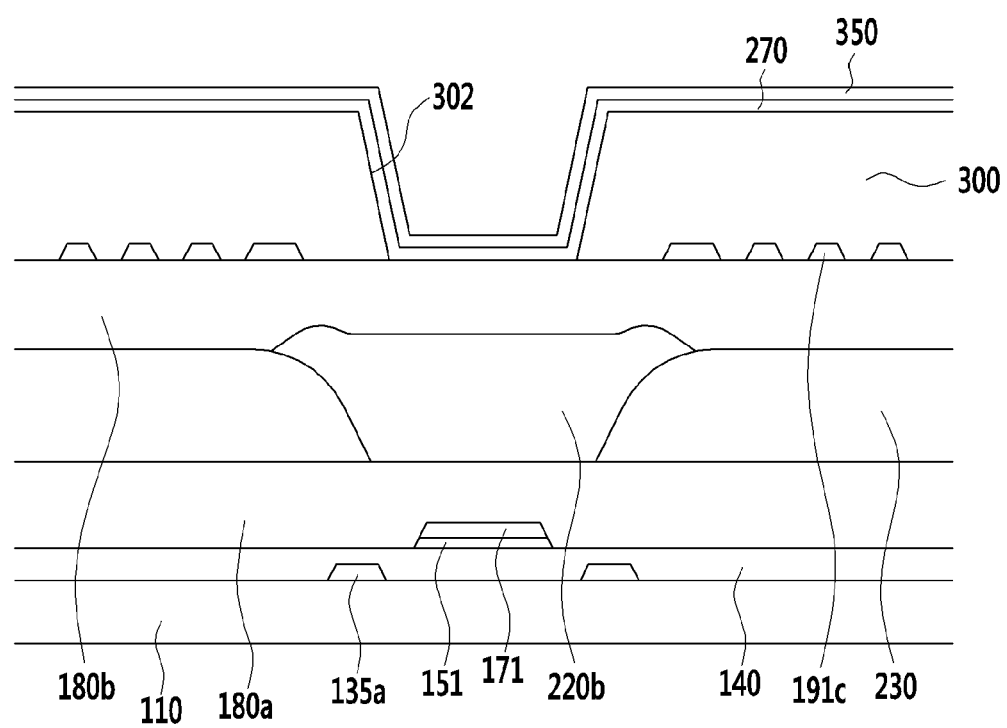

Referring to FIGS. 10 to 12, the common electrode 270 and the lower insulating layer 350 are sequentially formed on the sacrificial layer 300. The common electrode 270 and the lower insulating layer 350 are formed covering the recessed portion RP and the trench 302.

Figure 13:
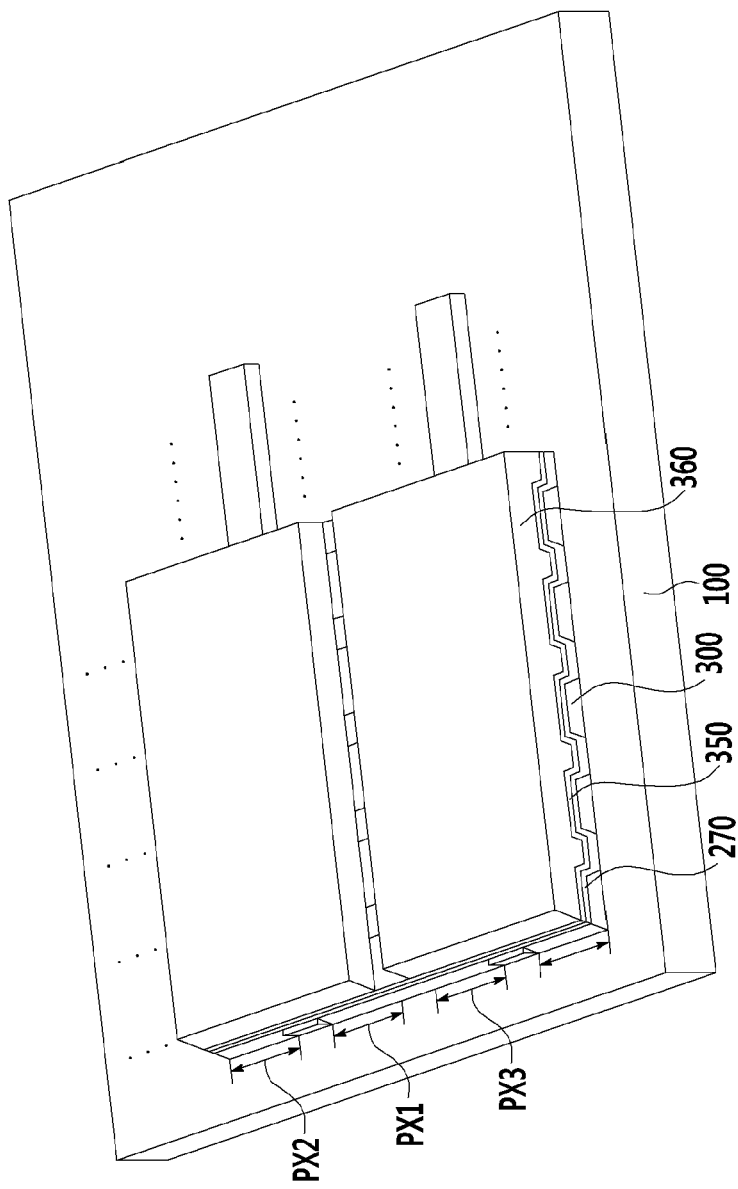
Figure 14:
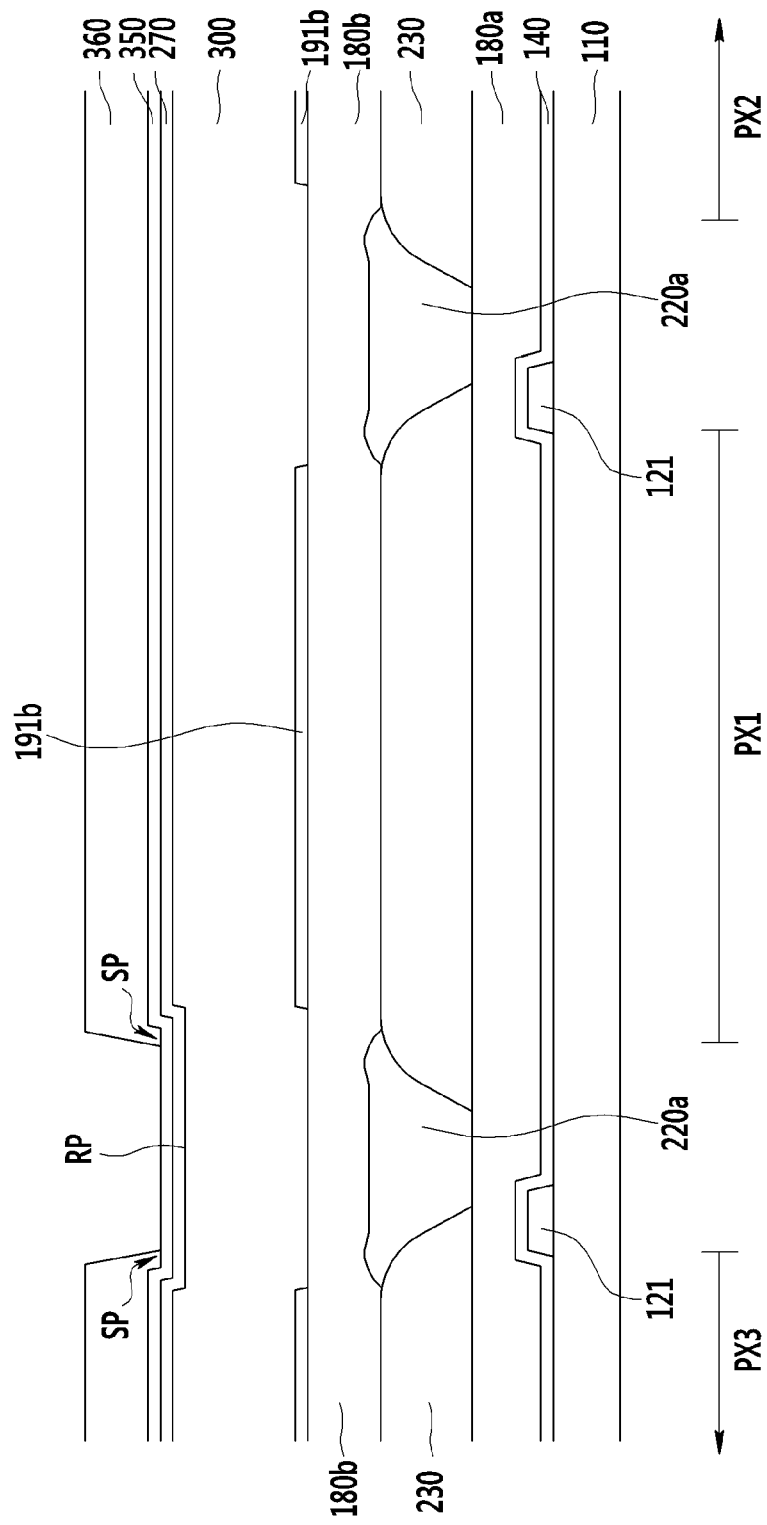
Figure 15:
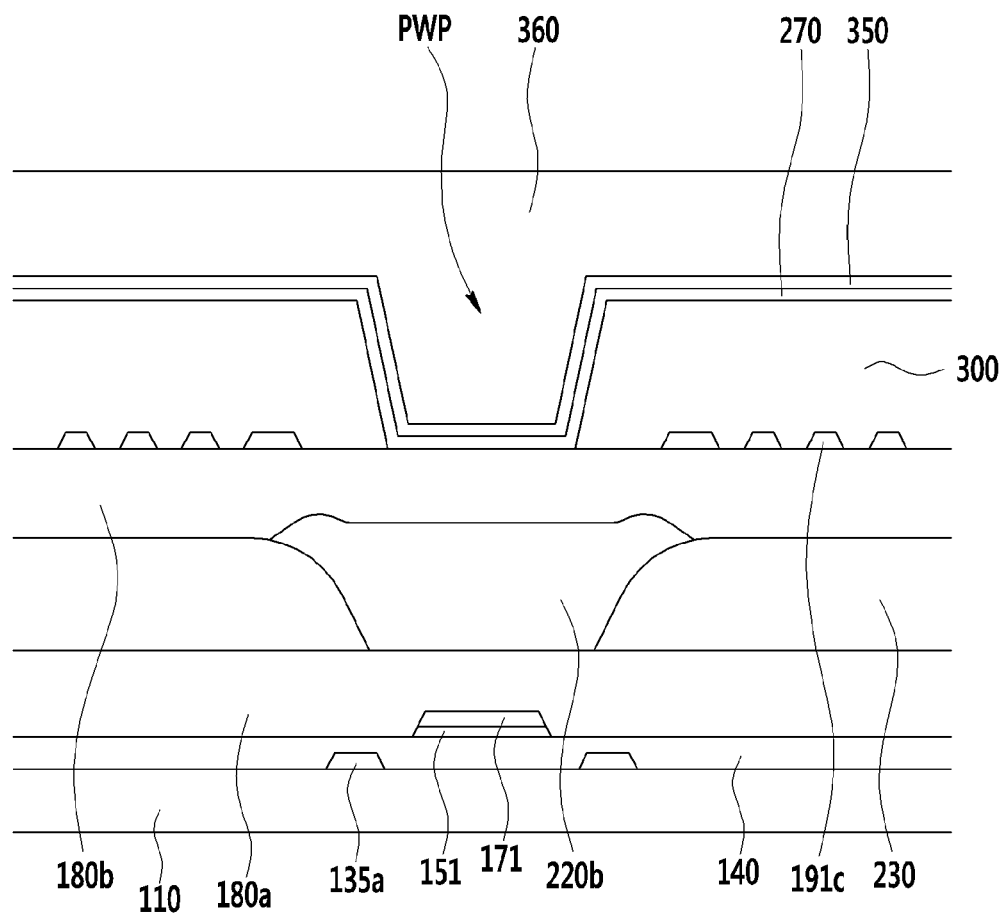

Referring to FIGS. 13 to 15, the roof layer 360 is formed on the lower insulating layer 350. A portion of the roof layer 360 may be removed in a region where the first sacrificial layer 300a is not formed (corresponding to where the horizontal light blocking member 220a is disposed between adjacent pixel areas PX1 and PX3, as illustrated in FIG. 14). The portion of the roof layer 360 may be removed in the vertical direction by an exposure and development process. As illustrated in FIGS. 13 and 14, the portion of the roof layer 360 on the first sacrificial layer 300a disposed between the first pixel area PX1 and the second pixel area PX2 is not removed, while the portion of the roof layer 360 disposed between the first pixel area PX1 and the third pixel area PX3 is removed. The portion of the roof layer 360 is removed so as to expose a portion of the upper surface of the lower insulating layer 350. As shown in FIG. 14, the roof layer 360 may be removed at a portion corresponding to the recessed portion RP, and a width of the removed roof layer 360 may be smaller than a width of the recessed portion RP.

The roof layer 360 covers both edges of the recessed portion RP, so that the protrusion portion SP is formed, as illustrated in FIG. 14.

As shown in FIG. 15, the roof layer 360 forms the partition wall forming portion PWP, the common electrode 270, the lower insulating layer 350, and the trench 302.

Figure 16:
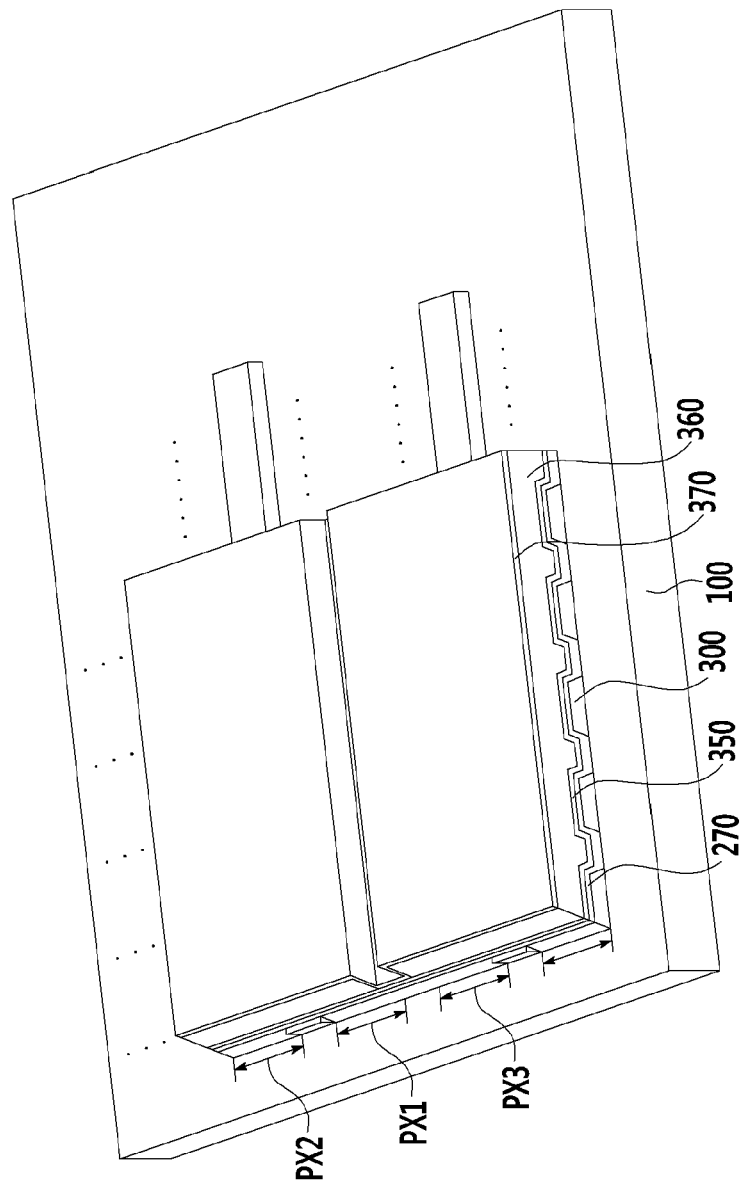
Figure 17:
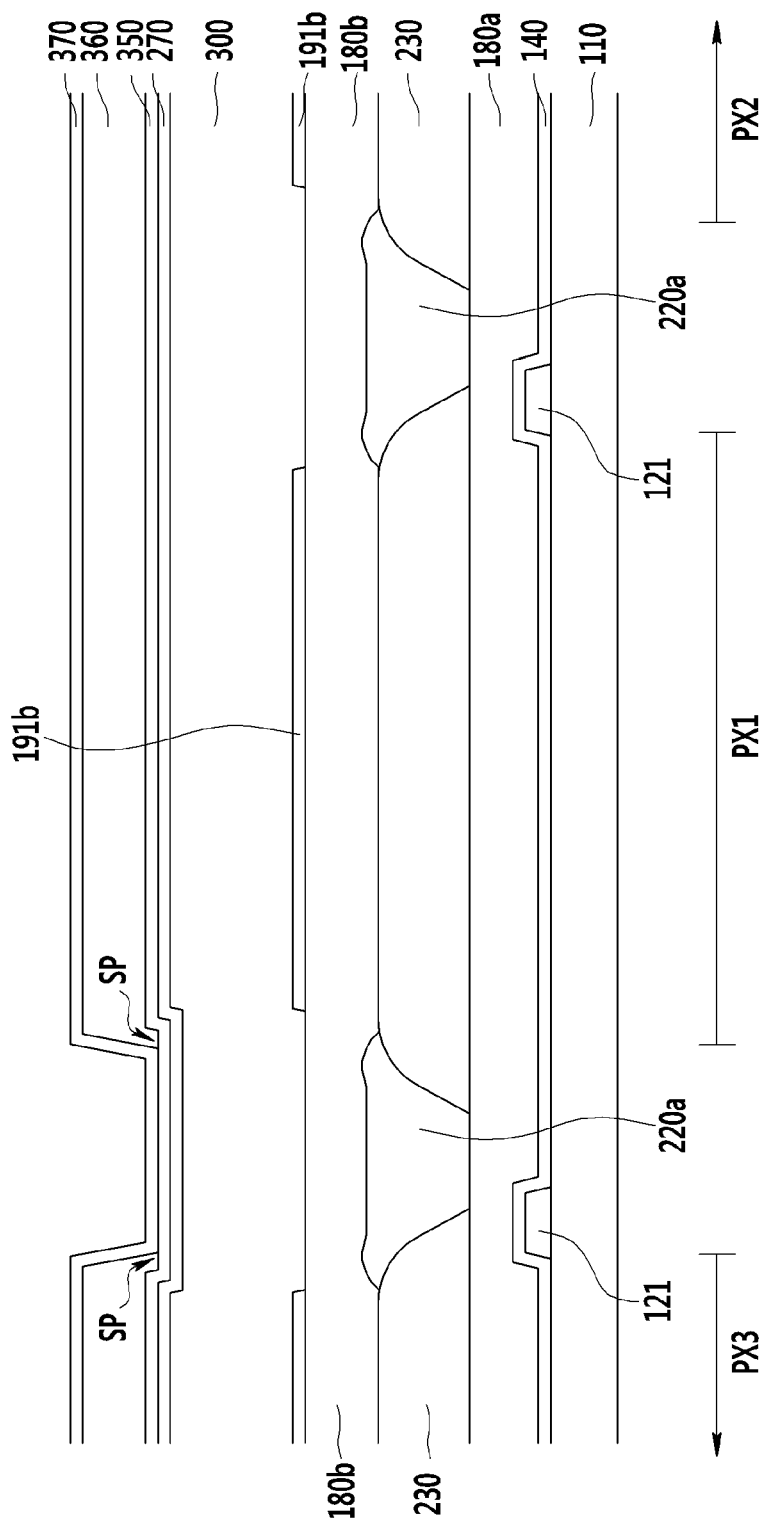
Figure 18:
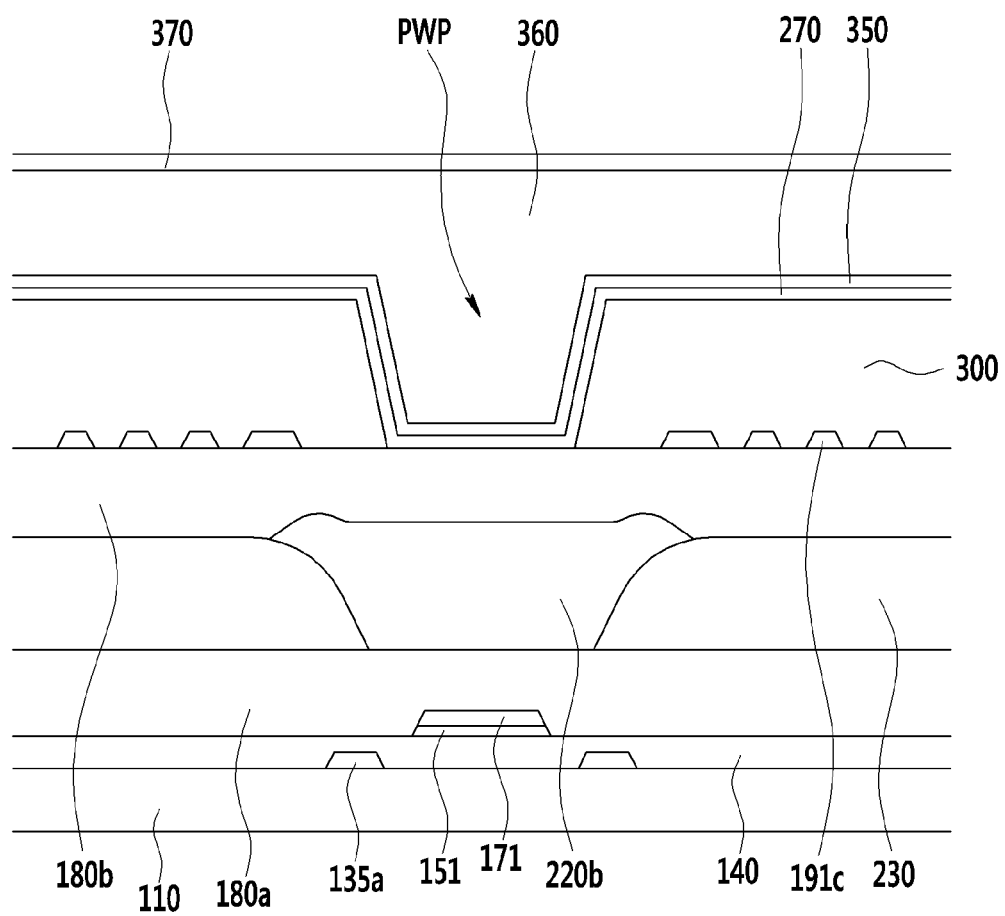

Referring to FIGS. 16 to 18, the upper insulating layer 370 is formed on the roof layer 360. The upper insulating layer 370 may be formed covering the removed portion of the roof layer 360.

Figure 19:
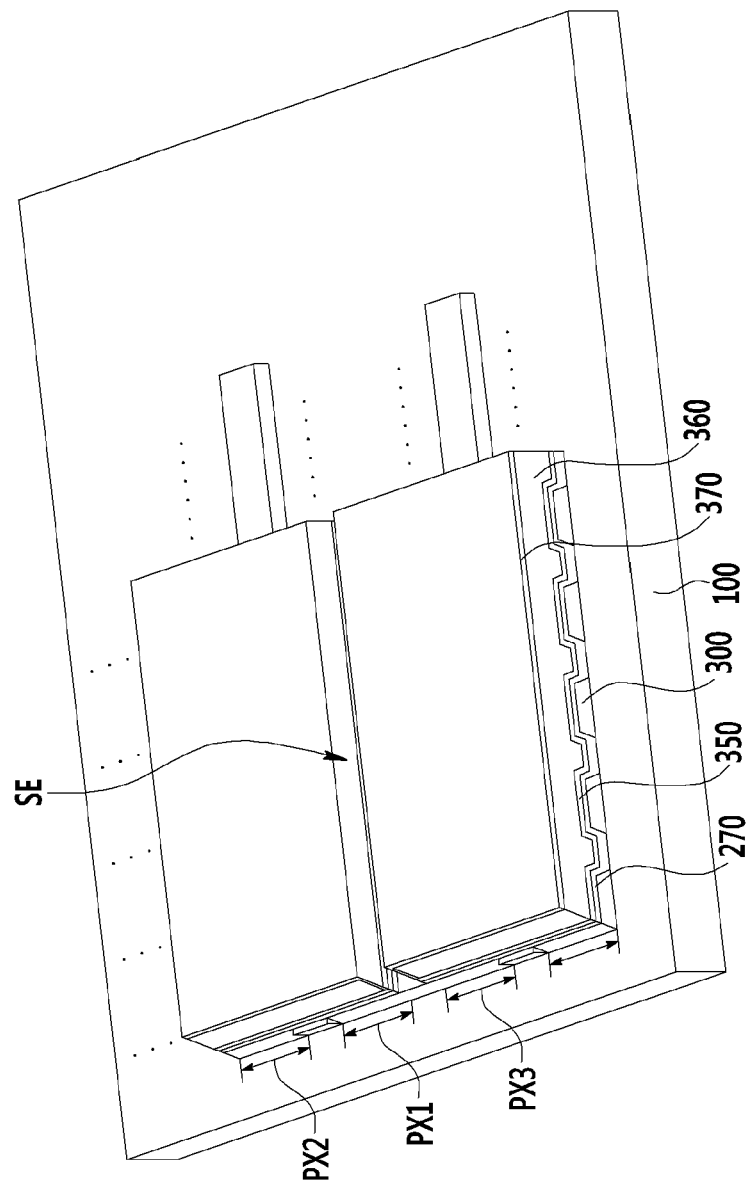
Figure 20:
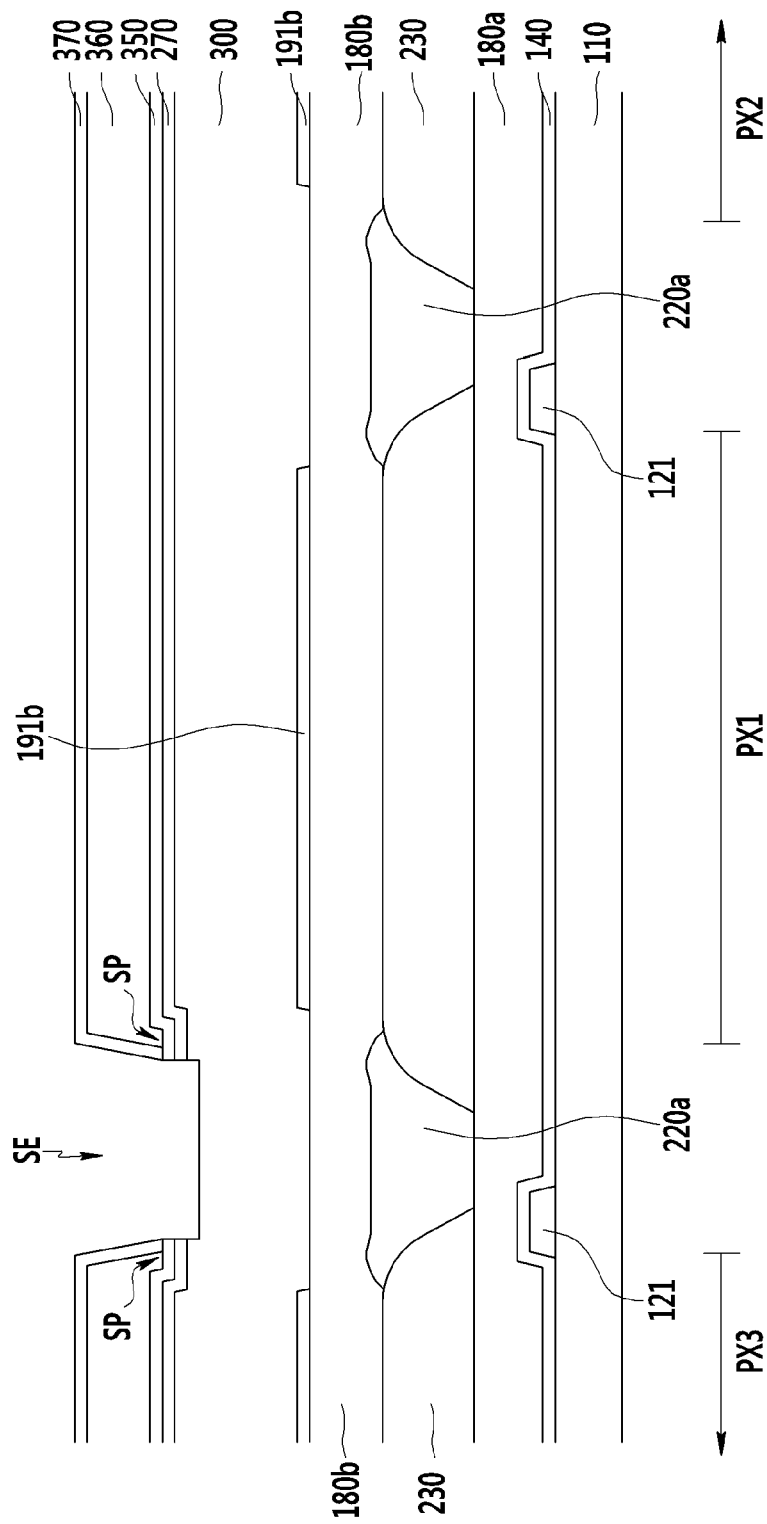

Referring to FIGS. 19 and 20, the sacrificial layer 300 disposed between the first pixel area PX1 and the third pixel area PX3 is exposed by patterning the upper insulating layer 370, the lower insulating layer 350, and the common electrode 270. A chemical injection hole SE is formed at a portion corresponding to the space between the first pixel area PX1 and the third pixel area PX3, with the chemical injection hole SE exposing the sacrificial layer 300.

Figure 21:
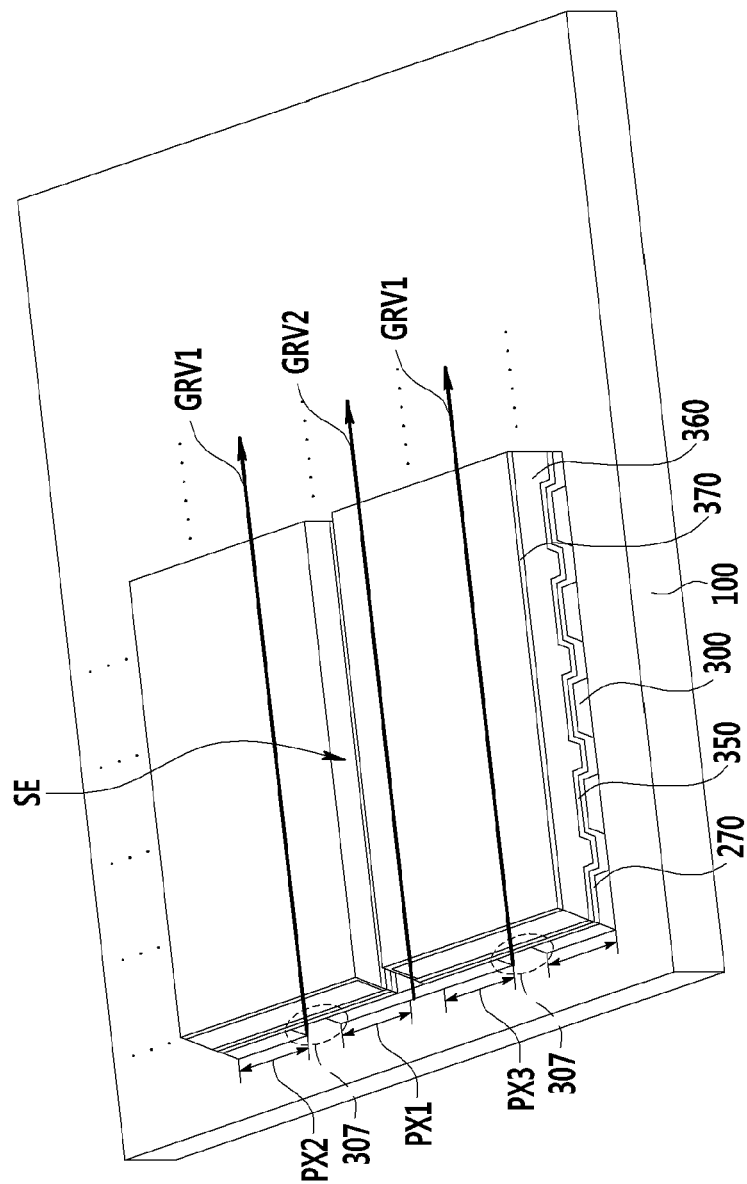
Figure 22:
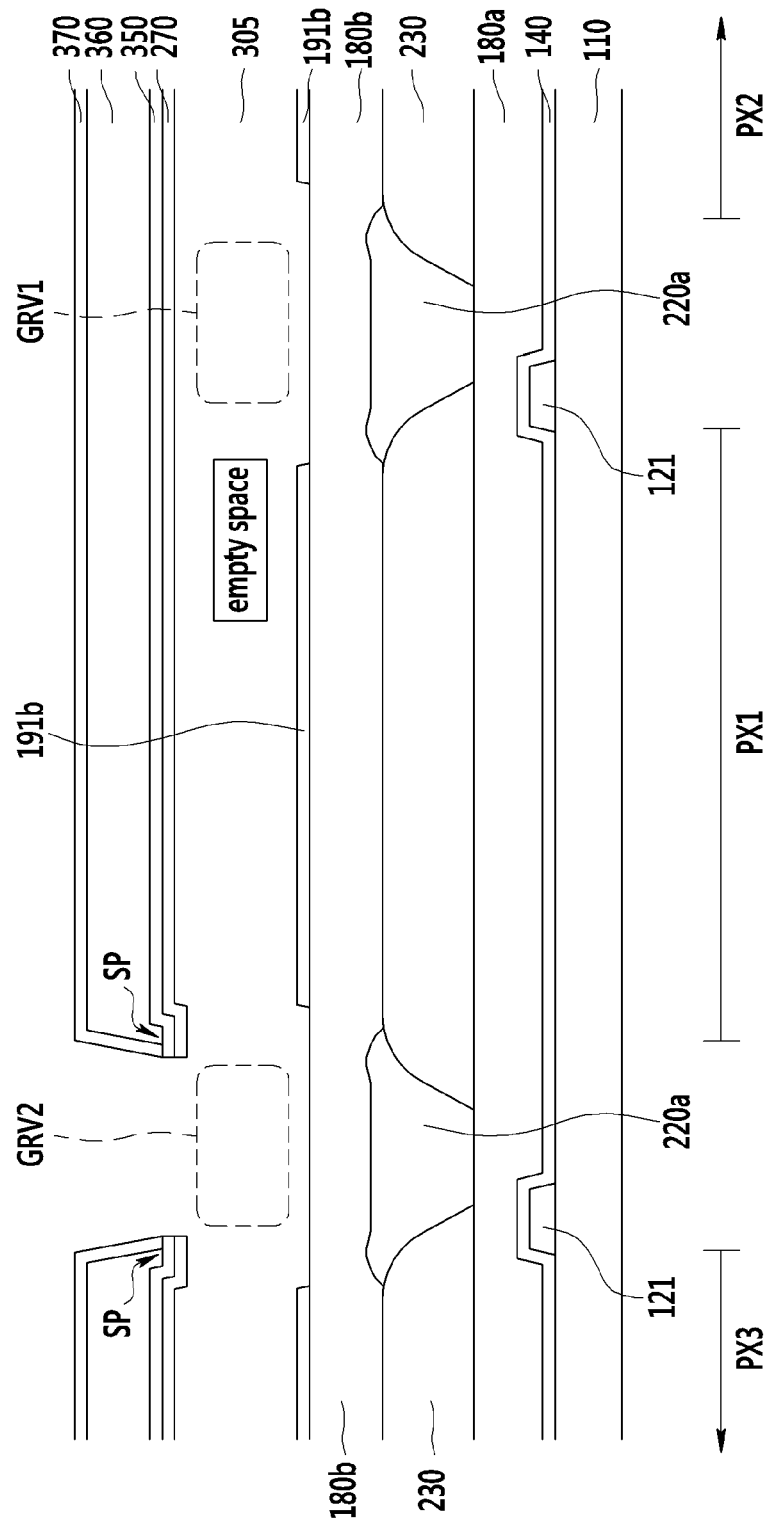
Figure 23:
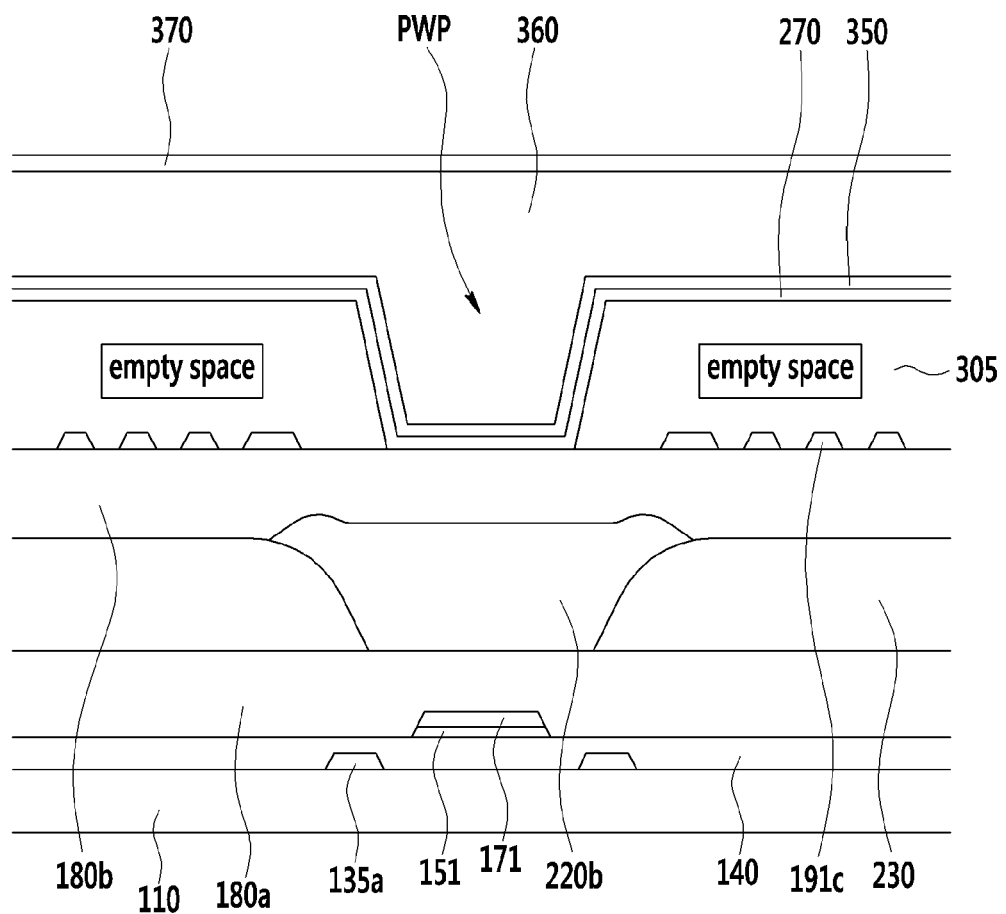

Referring to FIGS. 21 to 23, the sacrificial layer 300 is removed through the chemical liquid injection hole SE using an $O_2$ ashing processing or a wet etching method. Accordingly, the microcavity 305 having the liquid crystal injection hole 307 is formed by the removal of the sacrificial layer 300. The microcavity 305 comprises empty space as illustrated in FIGS. 22 and 23. As illustrated in FIG. 21, the liquid crystal injection hole 307 is formed at the edge of the thin film transistor display panel 100, and the first groove GRV1 and the second groove GRV2 are formed in the direction in which the gate line 121 extends. The liquid crystal injection hole 307 is formed at an end portion of the first groove GRV1.

Figure 24:
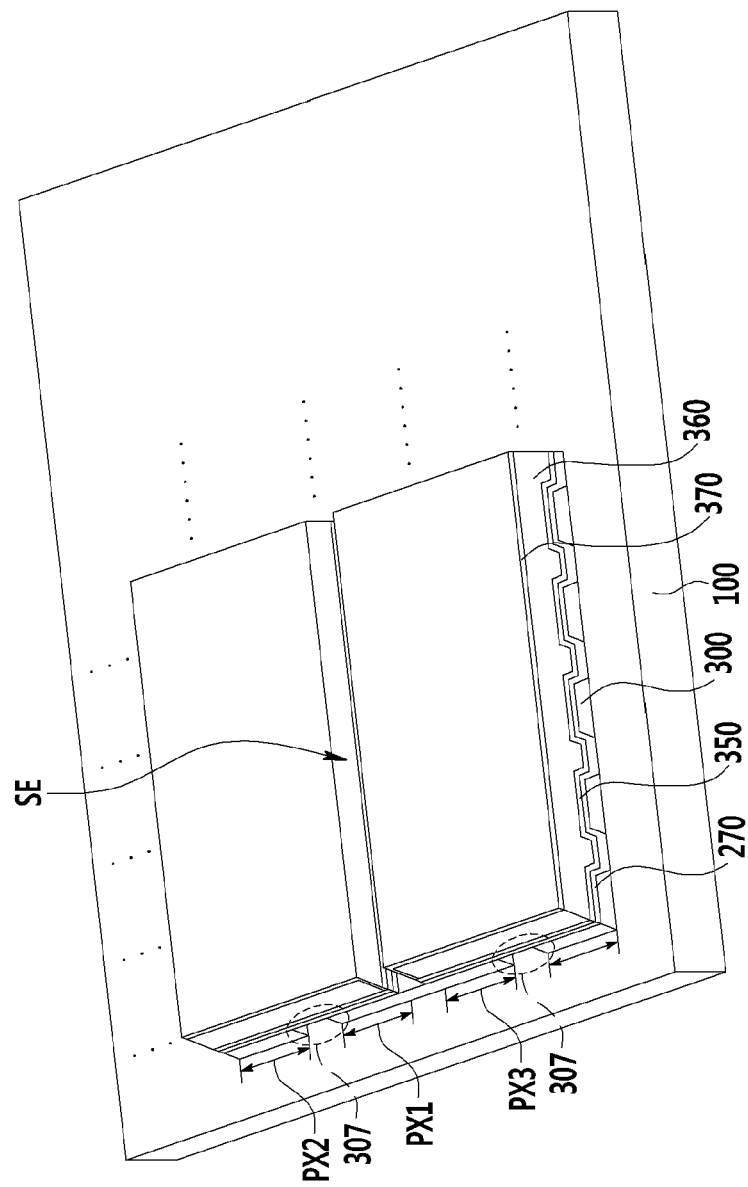
Figure 25:
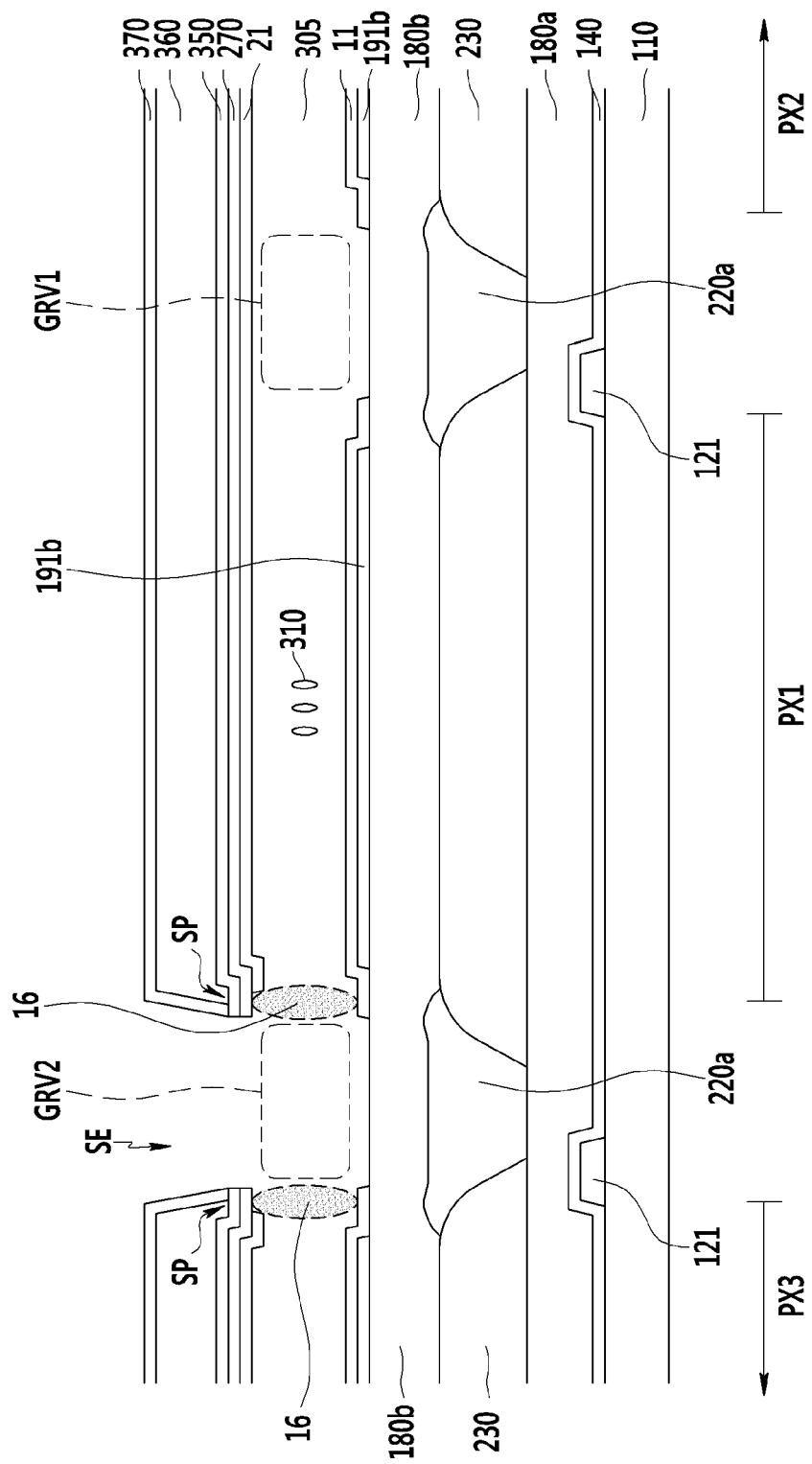
Figure 26:
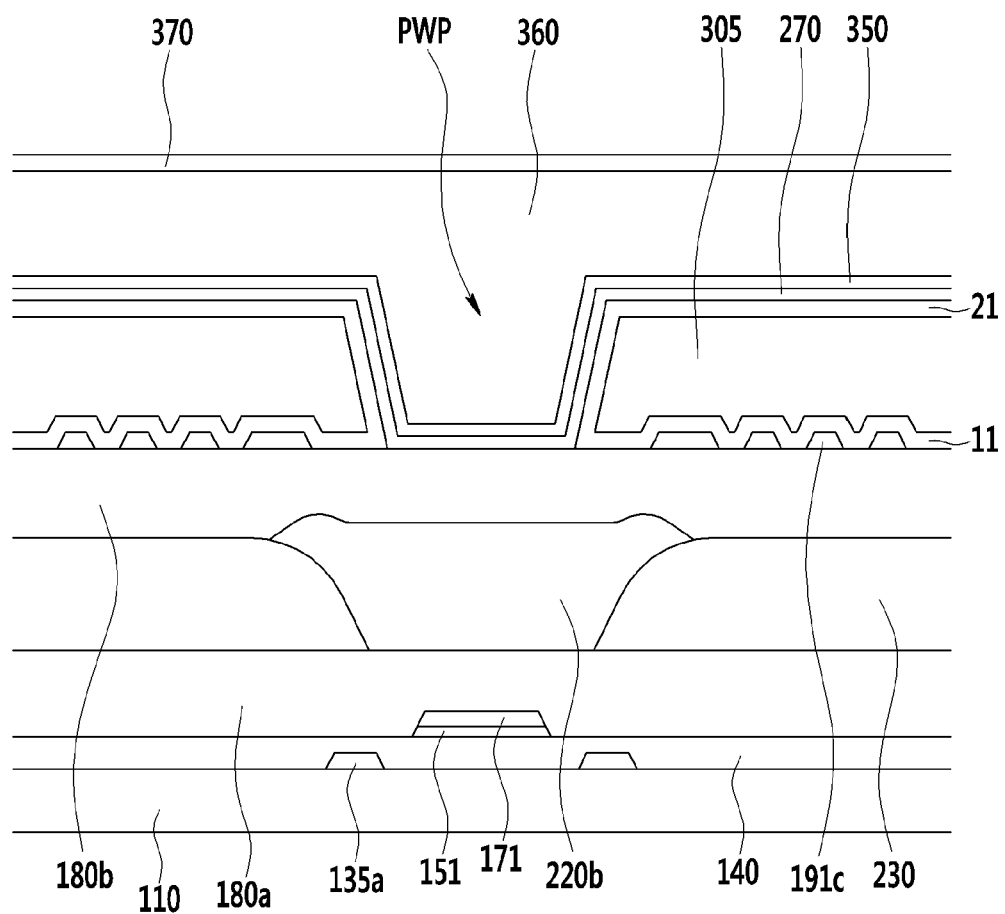

Referring to FIGS. 24 to 26, the alignment material (including solids and a solvent) is injected through the chemical liquid injection hole SE, and then a baking process is performed. The alignment material is injected onto the second groove GRV2 and flows into the microcavity 305 via capillary force. The alignment material is then dried by the baking process, so as to form the lower alignment layer 11 and the upper alignment layer 21. The solids that dry and remain after the baking process subsequently move to the edge of the microcavity 305 where the protrusion portion SP of the roof layer 360 is disposed. The solids then agglomerate at the edge of the microcavity 305 thereby forming the partition wall 16. The partition wall 16 separates the liquid crystal material in the first pixel area PX1 and the liquid crystal material in the third pixel area PX3.

Figure 27:
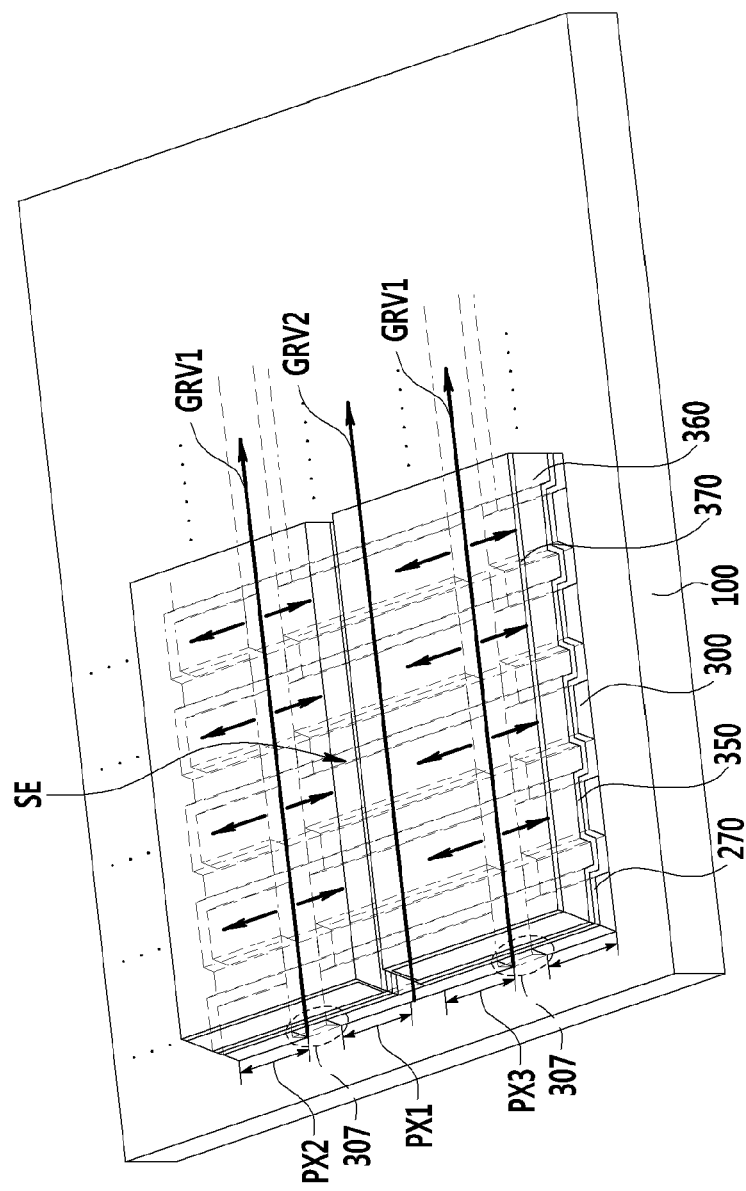
Figure 28:
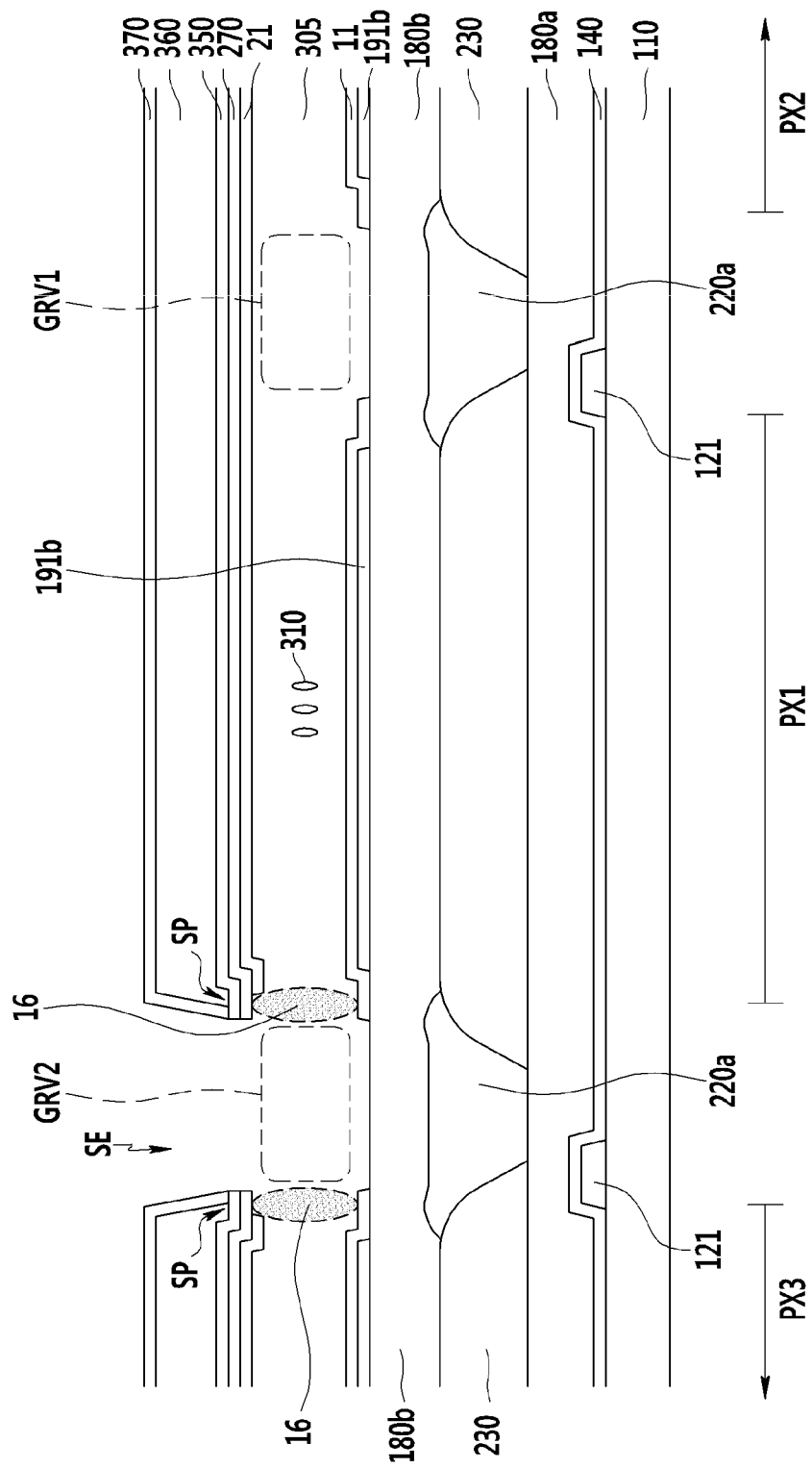
Figure 29:
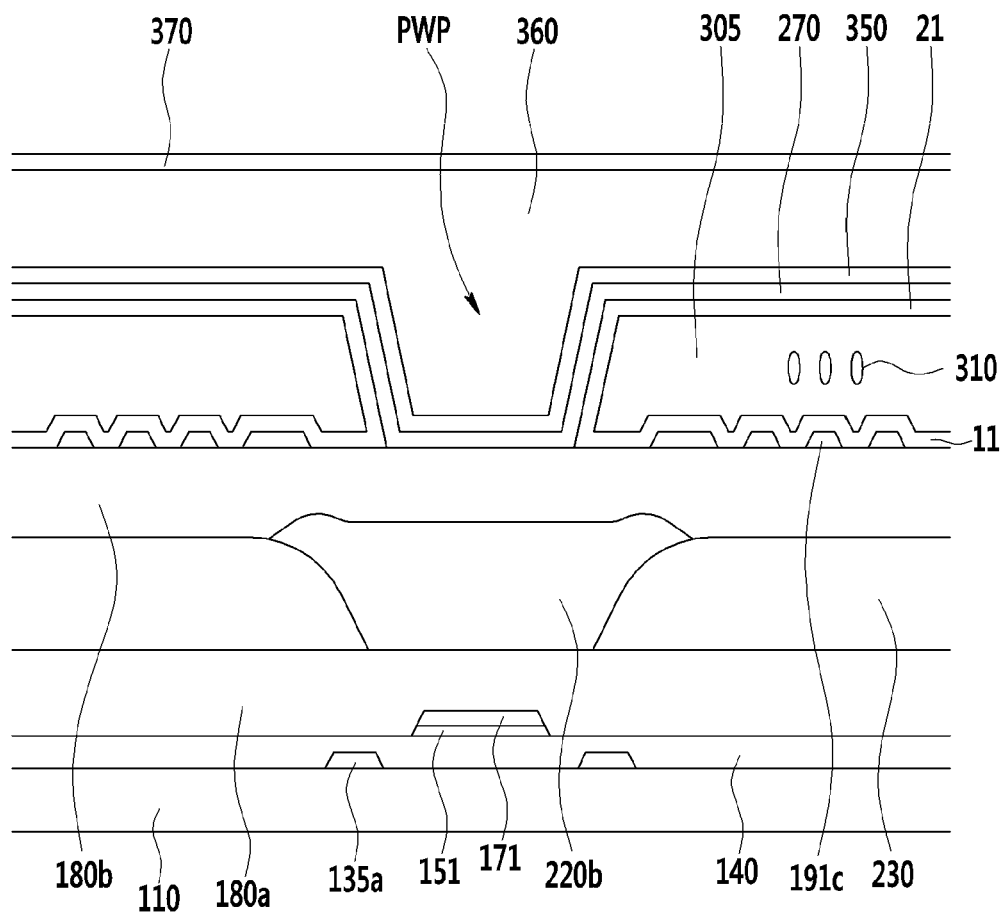

Referring to FIGS. 27 to 29, the liquid crystal material may be supplied through the liquid crystal injection hole 307 formed at the end portion of the first groove GRV1. The liquid crystal material may be supplied using, for example, a dispenser equipment. Although not illustrated, the liquid crystal material may also be supplied from an end portion of another first groove GRV1 disposed at an opposite side of the end portion of the first groove GRV1. It is noted that the liquid crystal material may be supplied in a vacuum environment so as to increase the capillary force.

The liquid crystal material is injected through the first groove GRV1, and flows into the microcavity 305 via capillary force (in the direction of the arrows indicated in FIG. 27). The liquid crystal material (including the liquid crystal molecules 310) in the microcavity 305 forms the liquid crystal layer. In some embodiments, the liquid crystal material may also be present in the first groove GRV1.

Referring to FIG. 30, the end of the first groove GRV1 is covered by a capping material 410 to encapsulate the liquid crystal material. As mentioned previously, the liquid crystal material is separated from the capping material 410 by the partition wall 16 of FIG. 28.

In some other embodiments, an outermost pixel area may be formed in direct contact with the capping material. However, the outermost pixel area is not formed as a region for displaying an image. Instead, the outermost pixel area is used as a pixel area of a dummy pattern. Thus, even though the outermost pixel area may come into contact with the capping material, the risk of contaminating the liquid crystal in the pixel areas for displaying an image is low because the outermost pixel area is being used as a dummy pattern.

In the present exemplary embodiment, the end portion of the first groove GRV1 is covered by the capping material, which reduces the risk of the capping material coming into contact with (and contaminating) the liquid crystal material. Further, the liquid crystal drop defect is not generated in that a drop method is not applied.

While this inventive concept has been described in connection with what are presently considered to be exemplary embodiments, it is to be understood that the inventive concept is not limited to the described embodiments, but, on the contrary, is intended to cover various modifications and equivalent arrangements within the spirit and scope of the present disclosure.

What is claimed is:

1. A liquid crystal display, comprising:
a thin film transistor disposed on a substrate;
a pixel electrode connected to the thin film transistor;
a lower insulating layer disposed facing the pixel electrode;
a roof layer disposed on the lower insulating layer; and
a liquid crystal layer disposed in a microcavity between the pixel electrode and the lower insulating layer, the microcavity including a liquid crystal material,
wherein a first groove is disposed between a first pixel area and a second pixel area, a second groove is disposed between the first pixel area and a third pixel area,
wherein the first groove is covered by the roof layer, the second groove is disposed to correspond to a portion where the roof layer is removed, the first pixel area corresponds to the pixel electrode, and the first pixel area is disposed between the second pixel area and the third pixel area, and
wherein the first groove is disposed substantially in parallel to the second groove.

2. The liquid crystal display of claim 1, further comprising:
an overcoat layer disposed on the roof layer, wherein the overcoat layer is disposed in the second groove and the liquid crystal material is disposed in the first groove.

3. The liquid crystal display of claim 2, wherein:
a liquid crystal injection hole is formed at an end of the first groove, and the liquid crystal injection hole is capped by a capping material.

4. The liquid crystal display of claim 3, wherein:
an alignment layer is disposed in at least one of a space between the microcavity and the pixel electrode, and a space between the microcavity and the lower insulating layer.

5. The liquid crystal display of claim 4, wherein:
a partition wall formed of an alignment material is disposed at an edge portion of the microcavity adjacent to the second groove.

6. The liquid crystal display of claim 5, wherein:
the partition wall separates the second groove and the microcavity.

7. The liquid crystal display of claim 6, wherein:
a thickness of the roof layer at a first region corresponding to the partition wall is greater than a thickness of the roof layer at a second region corresponding to the microcavity.

8. The liquid crystal display of claim 1, further comprising:
a common electrode disposed between the microcavity and the lower insulating layer.

9. The liquid crystal display of claim 1, further comprising:
a gate line on the substrate, wherein the first groove is disposed in a first direction in which the gate line extends, a second groove is disposed in the first direction, and wherein the first pixel area, the second pixel area, and the third pixel area are disposed in a second direction that is substantially perpendicular to the first direction.

10. The liquid crystal display of claim 1, further comprising:

a plurality of microcavities, and a partition wall forming portion disposed between adjacent microcavities parallel to a direction in which the first groove or the second groove extends, wherein the partition wall forming portion comprises the roof layer.

11. A method of manufacturing a liquid crystal display, comprising:

forming a thin film transistor on a substrate;

forming a pixel electrode connected to the thin film transistor;

forming a sacrificial layer on the pixel electrode;

forming a lower insulating layer on the sacrificial layer;

forming a roof layer on the lower insulating layer;

forming a microcavity between a first groove and second groove by removing the sacrificial layer;

injecting a liquid crystal material through a liquid crystal injection hole formed at an end portion of the first groove; and capping the liquid crystal injection hole, wherein the first groove is covered by the roof layer, and the second groove is disposed to correspond to a portion where the roof layer is removed, wherein the first groove is formed substantially in parallel to the second groove.

12. The method of claim 11, wherein forming the sacrificial layer comprises:

forming a first sacrificial layer and a second sacrificial layer, wherein the first sacrificial layer is formed in a region where the first groove is formed, and a trench is formed between the second sacrificial layer and another adjacent second sacrificial layer.

13. The method of claim 12, wherein forming the sacrificial layer further comprises:

forming a recessed portion in the second sacrificial layer.

14. The method of claim 13, wherein forming the roof layer comprises:

forming the first sacrificial layer so as to cover the pixel electrode, and removing the portion of the roof layer so as to expose the second groove.

15. The method of claim 14, wherein:

a width of the removed portion of the roof layer is less than a width of the recessed portion.

16. The method of claim 15, wherein removing the sacrificial layer comprises:

injecting a chemical for removing the sacrificial layer through the second groove.

17. The method of claim 16, further comprising:

injecting an alignment material into the microcavity and drying the alignment material, wherein solids remaining after the drying of the alignment material form a partition wall at an edge portion of the microcavity adjacent to the second groove.

18. The method of claim 11, wherein:

the liquid crystal material injected through the liquid crystal injection hole flows along the first groove into the microcavity.

19. The method of claim 18, wherein:

the injecting of the liquid crystal material is performed in a vacuum environment.

20. The method of claim 19, further comprising:

forming an overcoat layer on the roof layer, wherein the overcoat layer is disposed in the second groove.

* * * * *